(12) United States Patent
Kagawa et al.

(10) Patent No.: US 6,317,918 B1
(45) Date of Patent: Nov. 20, 2001

(54) WINDSHIELD WIPER DEVICE FOR VEHICLE

(75) Inventors: Mamoru Kagawa, Wako; Kazuhide Kuno, Kosai; Jiroh Kamiya, Kosai; Yuji Watanabe, Kosai, all of (JP)

(73) Assignees: Honda Giken Kogyo Kabushiki Kaisha, Tokyo; Asmo Co., Ltd., Kosai, both of (JP)

( * ) Notice: Subject to any disclaimer, the term of this patent is extended or adjusted under 35 U.S.C. 154(b) by 0 days.

(21) Appl. No.: 09/299,118

(22) Filed: Apr. 24, 1999

(30) Foreign Application Priority Data

| Apr. 24, 1998 | (JP) | 10-114548 |
| Aug. 21, 1998 | (JP) | 10-235885 |
| Aug. 21, 1998 | (JP) | 10-235972 |
| Aug. 21, 1998 | (JP) | 10-235973 |

(51) Int. Cl.[7] .................................................... B60S 1/06
(52) U.S. Cl. .................................... 15/250.31; 015/250.3; 384/624; 384/903; 403/2; 403/DIG. 3
(58) Field of Search ........................... 015/250.3, 250.351, 015/250.352, 250.34, 250.31, 250.27; 403/2, DIG. 3; 384/415, 624, 296, 903

(56) References Cited

U.S. PATENT DOCUMENTS

| 3,790,985 | * | 2/1974 | Kessler | 15/250.34 |
| 5,203,049 | * | 4/1993 | Nogawa | 15/250.34 |
| 5,337,439 | * | 8/1994 | Frey et al. | 15/250.3 |
| 5,735,171 | * | 4/1998 | Moote et al. | 15/250.34 |

FOREIGN PATENT DOCUMENTS

| 466618 | * | 7/1950 | (CA) | 15/250.34 |
| 2911155 | * | 9/1980 | (DE) | 15/250.31 |
| 2133077 | * | 1/1973 | (DE) | 15/250.34 |
| 0916559 | | 5/1999 | (EP) | . |
| 1579 347 | * | 4/1969 | (FR) | 15/250.34 |
| 60-261 | | 1/1985 | (JP) | . |
| 61-75365 | * | 5/1986 | (JP) | . |
| 4-50551 | * | 4/1992 | (JP) | . |
| 11-139255 | | 5/1999 | (JP) | . |
| 11-139256 | | 5/1999 | (JP) | . |
| 64-16457 | * | 1/1989 | (JP) | 15/250.34 |
| 64-18749 | * | 1/1989 | (JP) | 15/250.31 |
| 64-18750 | * | 1/1989 | (JP) | 15/250.31 |

* cited by examiner

Primary Examiner—Gary K. Graham
(74) Attorney, Agent, or Firm—Carrier Blackman & Associates, P.C.; Joseph P. Carrier; William D. Blackman

(57) ABSTRACT

A windshield wiper device for a vehicle, for wiping the windshield of the vehicle, comprises at least one windshield wiping unit. The windshield wiping unit comprises a pivot holder attached to the body of the vehicle and having a cylindrical bearing part, a pivot shaft extended through and supported for turning in the bearing part on the pivot holder, a wiper arm having a base end part fixed to an outer end part of the pivot shaft, and a wiper blade assembly having a wiper blade and connected to the free end of the wiper arm. The pivot shaft is restrained from axial movement into the bearing part of the pivot holder by a retaining ring put there on and seated on an outer end surface of the bearing part of the pivot holder. The retaining is fractured or deformed to permit the pivot shaft to move axially into the bearing part when an axial force exceeding a predetermined level is exerted on the pivot shaft.

20 Claims, 21 Drawing Sheets

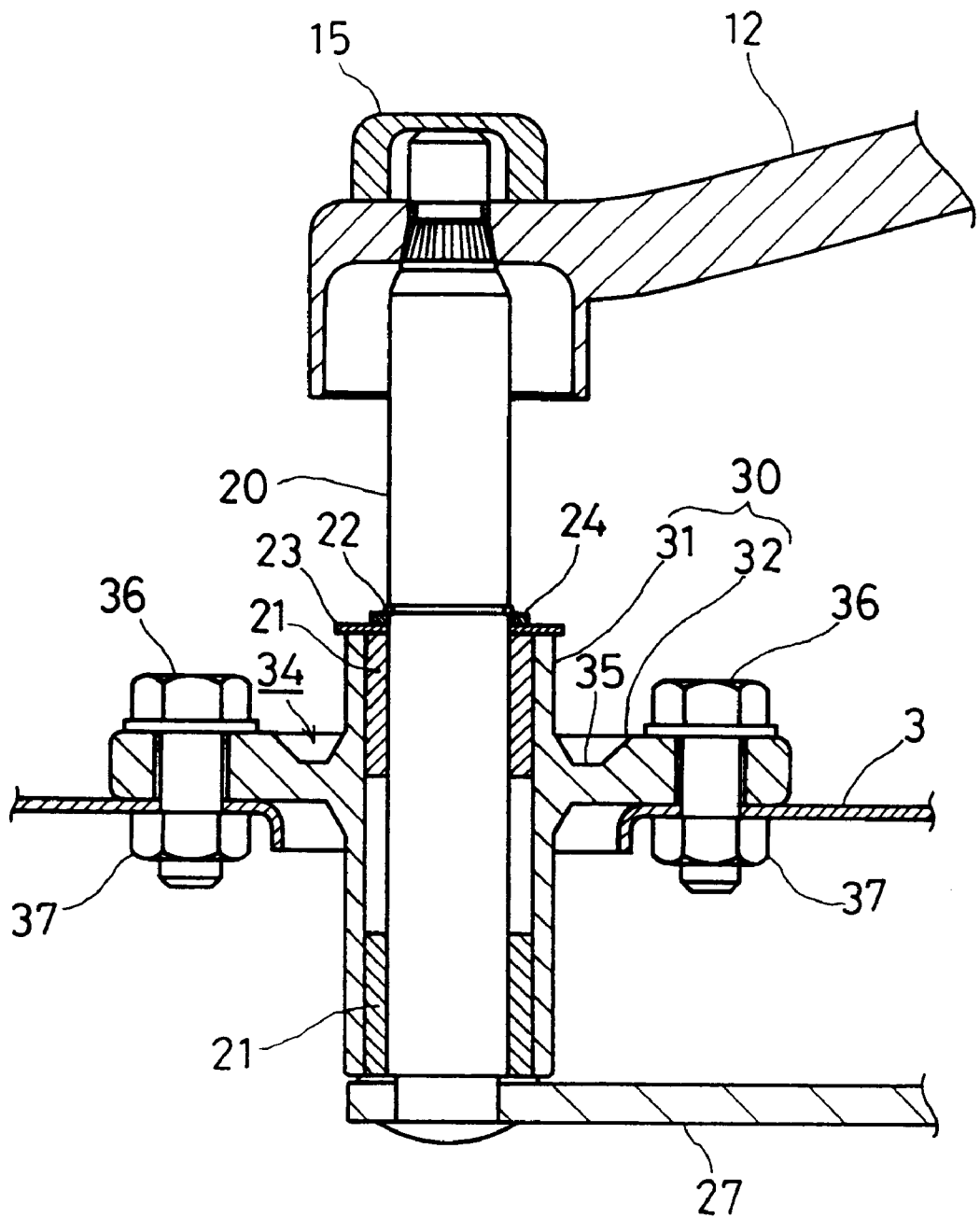
F I G . 2

F I G. 5
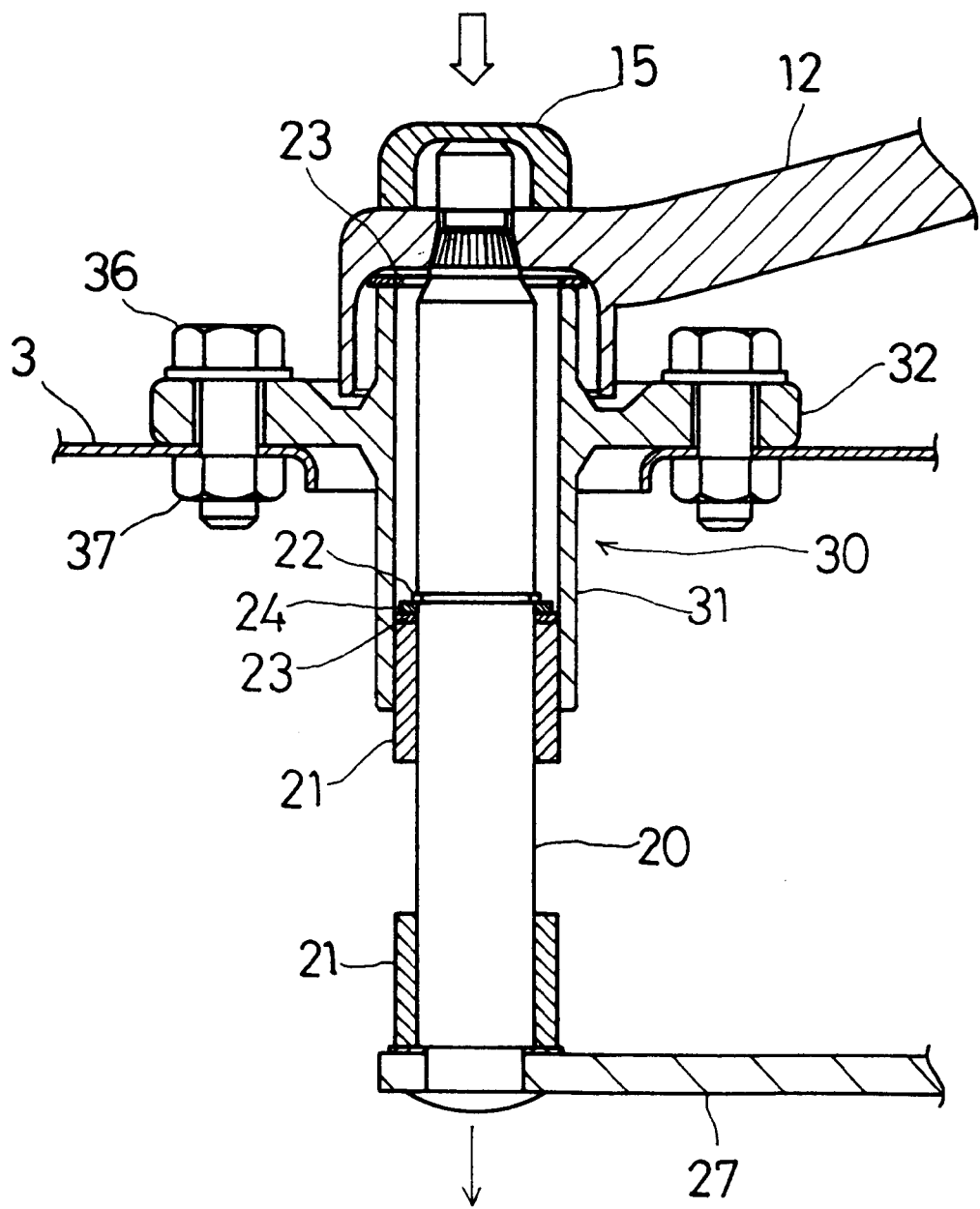

F I G. 15
(A)
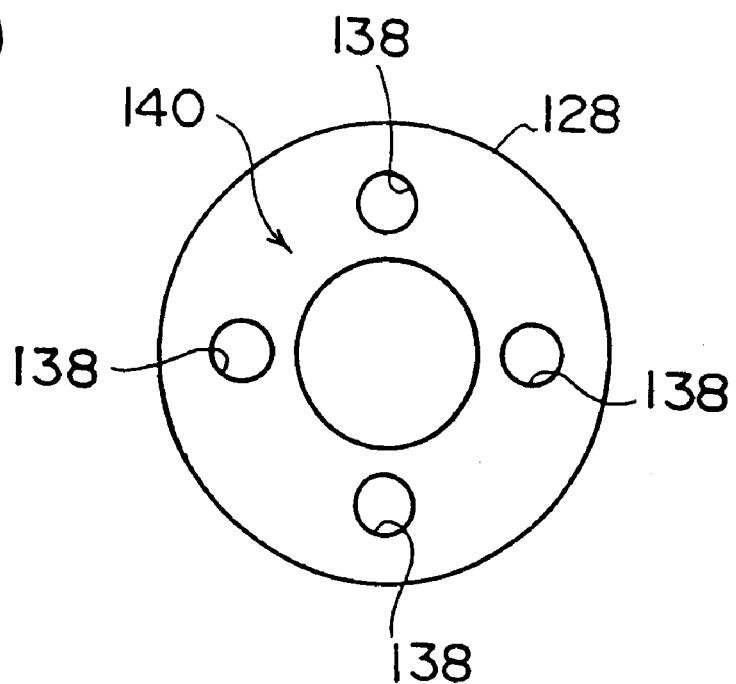
F I G. 15
(B)
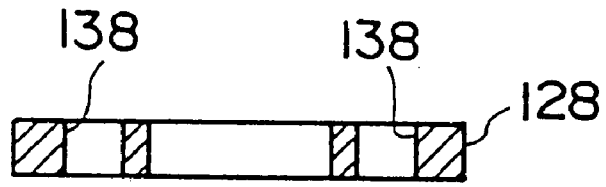

F I G. 16
(A)
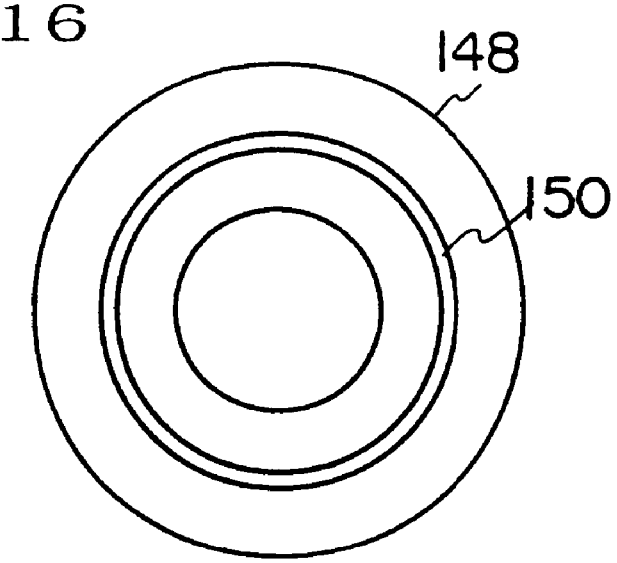
F I G. 16
(B)
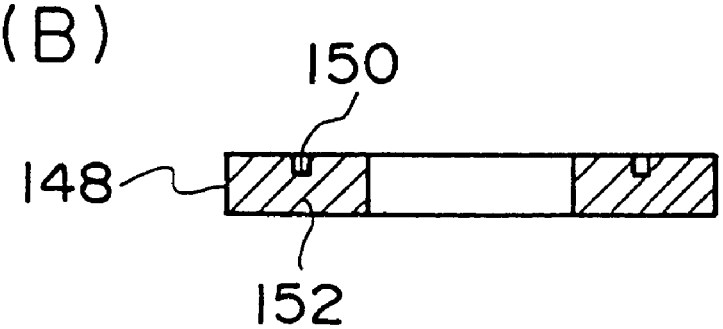

(A)

(B)

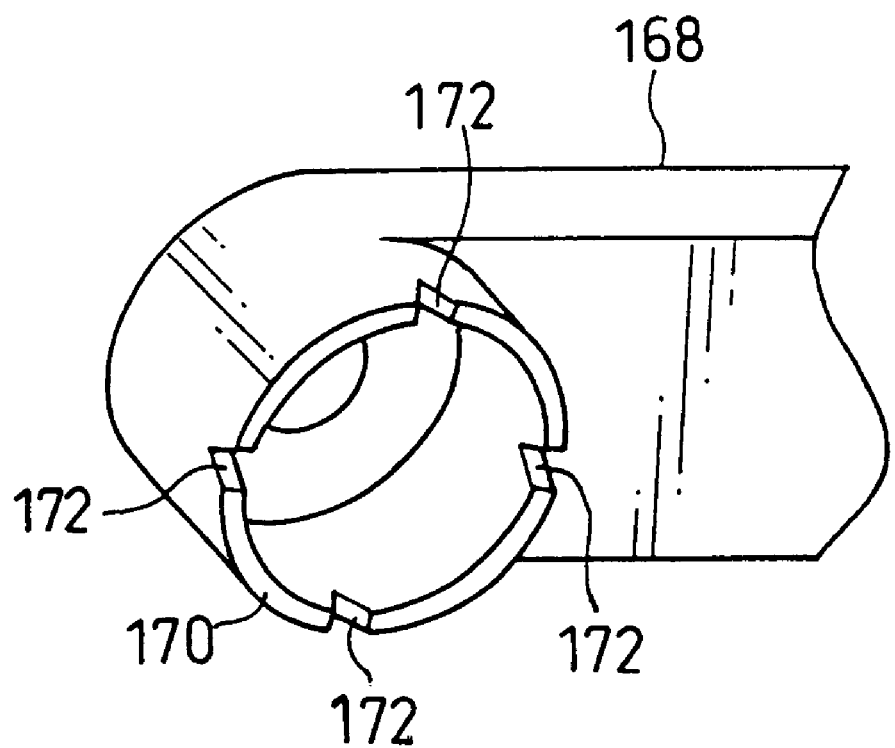
F I G . 18

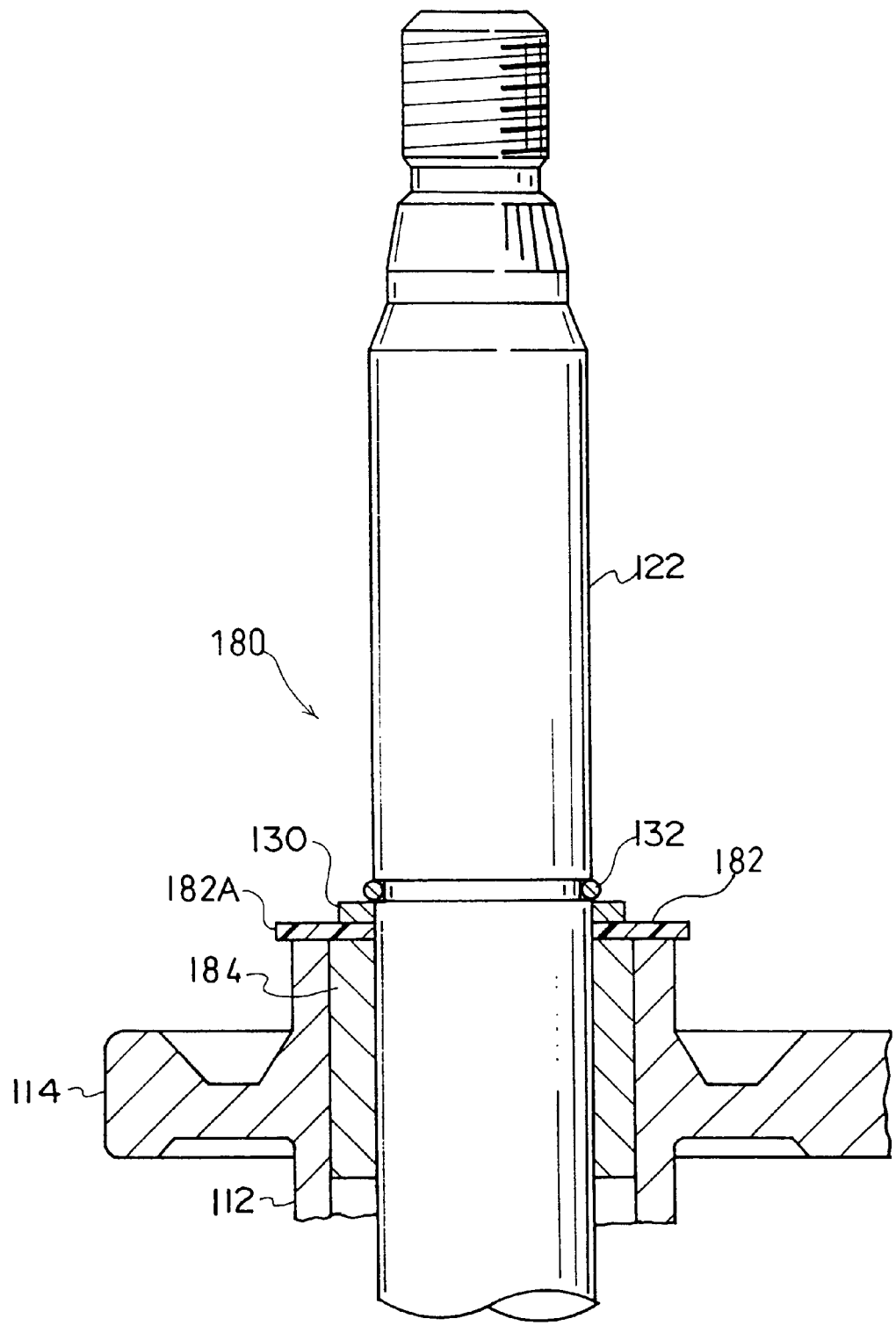
F I G . 20

(A)

(B)

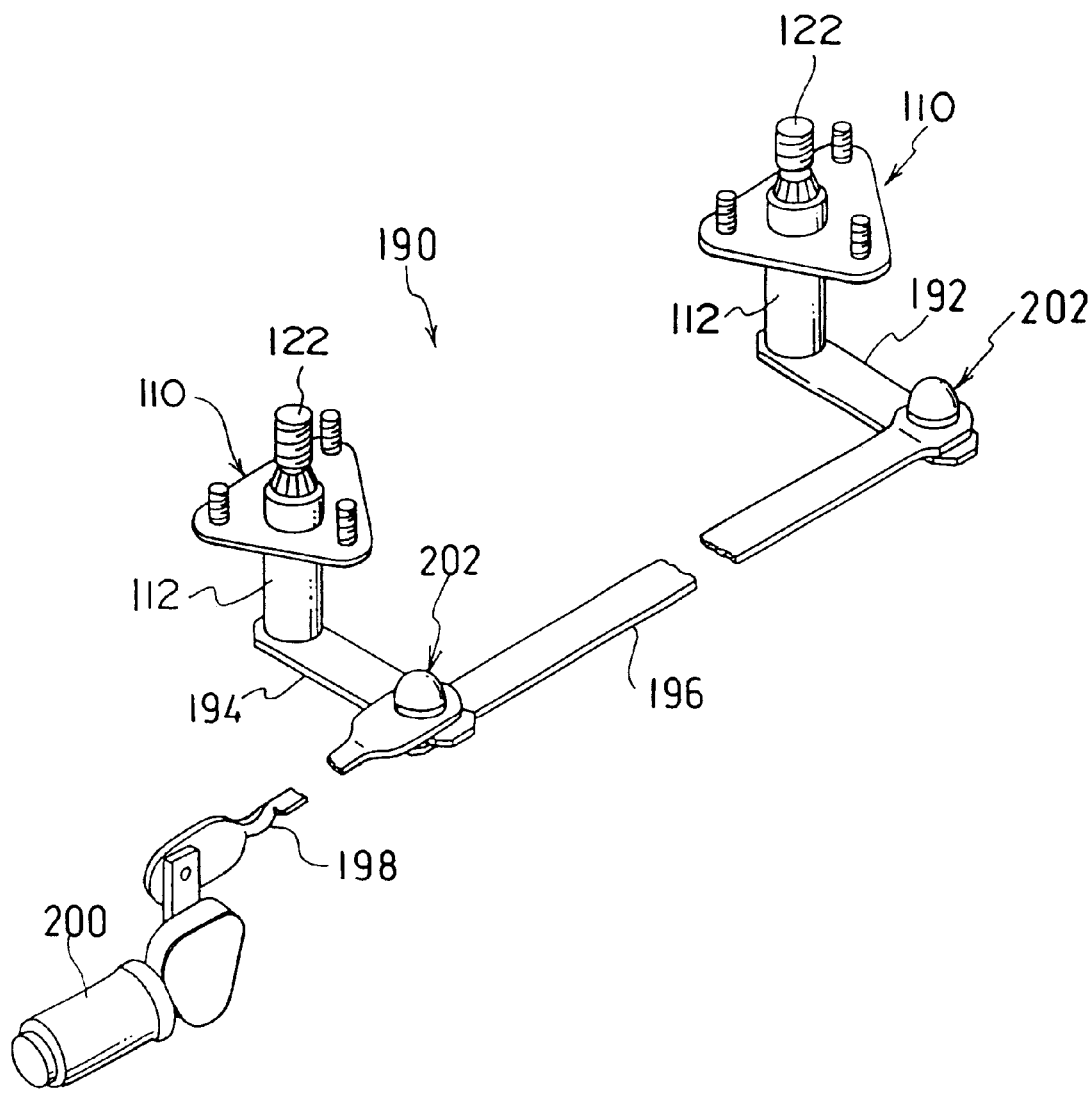
F I G. 22

WINDSHIELD WIPER DEVICE FOR VEHICLE

BACKGROUND OF THE INVENTION

1. Field of the Invention

The present invention relates to a windshield wiper device for automatically wiping off raindrops, snow, mud, dust and such adhering to the surface of the windshield of a vehicle.

2. Description of the Related Art

Generally, a windshield wiper device has at least one windshield wiping unit comprising a pivot holder attached to a panel forming the body of a vehicle, a pivot shaft supported for turning on the pivot holder, a wiper arm having a base end part fixed to an outer end part of the pivot shaft projecting outside from the pivot holder, and a wiper blade assembly having a wiper blade and connected to the free end of the wiper arm. The wiper arm is oscillated to wipe the surface of the windshield of the vehicle with the wiper blade.

A windshield wiper device proposed in JP-U No. 60-261 has a pivot shaft retaining mechanism for preventing a pivot shaft supported for turning on a pivot holder from coming off the pivot holder. This pivot shaft retaining mechanism employs a washer. The pivot shaft is provided with an annular groove, a metal washer or a wave washer is put on the pivot shaft and a C ring is fitted in the annular groove of the pivot shaft with the metal washer or the wave washer in contact with an end surface of the pivot holder. The metal washer or the wave washer retains the pivot shaft in place and limits the axially downward movement of the pivot shaft relative to the pivot holder. Thus the pivot holder is fixed to the body of the vehicle, and the pivot shaft projects from the surface of the body, the wiper arm is attached to a free end part of pivot shaft, and a wiper blade assembly is connected to the free end of the wiper arm. The pivot shaft is restrained securely from axial movement relative to the pivot holder and from falling off the pivot holder.

The pivot shaft having a considerably long part projecting outside from the surface of the body of the vehicle is subject to various exposure to external impact forces, and it is possible that the pivot shaft maybe forced to project further from the body to cause damage when the body is deformed by a collision of the vehicle against an obstacle. For example, there is a possibility that the projected pivot shaft strikes against and damages a lower part of the windshield of the vehicle.

SUMMARY OF THE INVENTION

Accordingly, it is an object of the present invention to provide a windshield wiper device having at least one windshield wiping unit provided with a pivot assembly capable of absorbing external shocks exerted thereon.

According to a first aspect of the present invention, a windshield wiper device for a vehicle, for wiping the windshield of the vehicle, comprises at least one windshield wiping unit comprising: a pivot holder attached to a body of the vehicle and having a cylindrical bearing part; a pivot shaft extended through and supported for turning in the bearing part on the pivot holder; a wiper arm having a base end part fixed to an outer end part of the pivot shaft; and a wiper blade assembly having a wiper blade and connected to a free end of the wiper arm; wherein a retaining member is interposed between the bearing part and the pivot shaft to restrain the pivot shaft from axial movement relative to the bearing part, and the retaining member is fractured to permit the pivot shaft to move axially into the bearing part when an axial force exceeding a predetermined level is exerted on the pivot shaft.

Thus the retaining member interposed between the bearing part and the pivot shaft is fractured and the pivot shaft is moved into the body when an excessively large external force is exerted on the pivot shaft. Consequently, the impact force applied to the pivot shaft is absorbed to limit damage to the main part of the windshield wiping unit and to a part of the panel forming the body and holding the windshield wiping unit, to the least unavoidable extent.

According to a second aspect of the present invention, a windshield wiper device for a vehicle, for wiping the windshield of the vehicle, comprises at least one windshield wiping unit comprising: a pivot holder attached to a body of the vehicle and provided with a cylindrical bearing part; a pivot shaft extended through and supported for turning in the bearing part on the pivot holder; a wiper arm having a base end part fixed to an outer end part of the pivot shaft; and a wiper blade assembly having a wiper blade and connected to a free end of the wiper arm; wherein a retaining member is interposed between the bearing part and the pivot shaft to restrain the pivot shaft from axial movement relative to the bearing part, and the retaining member is deformed to permit the pivot shaft to move axially into the bearing part when an axial force exceeding a predetermined level is exerted on the pivot shaft.

Thus the retaining member interposed between the bearing part and the pivot shaft is deformed and the pivot shaft is moved into the body when an excessively large external force is applied to the pivot shaft. Consequently, the impact force exerted on the pivot shaft is absorbed to limit damage to the main part of the windshield wiping unit and to the panel holding the pivot holder and forming the body to the least unavoidable extent.

In either of those windshield wiping devices according to the first and the second aspects of the present invention, the bearing part of the pivot holder may be provided on its outer surface with a flange attached to the body of the vehicle and with a thin annular part having a reduced fracture strength and contiguous with the bearing part.

When an excessively large external force is exerted obliquely on the pivot shaft holding the wiper arm, a stress is concentrated on the thin annular part of the flange, and the thin annular part of the flange is broken by stress concentration to permit the pivot holder to drop into the body of the vehicle and to absorb an impact force exerted on the pivot shaft.

According to a third aspect of the present invention, a windshield wiper device for a vehicle, for wiping the windshield of the vehicle, comprises at least one windshield wiping unit comprising: a pivot holder attached to a body of the vehicle and provided with a cylindrical bearing part; a pivot shaft extended through and supported for turning in the bearing part on the pivot holder; a wiper arm having a base end part fixed to an outer end part of the pivot shaft; a wiper blade assembly having a wiper blade and connected to a free end of the wiper arm; and a fastening member fastened by a predetermined fastening force to the pivot shaft and engaged with the bearing part to restrain the pivot shaft from axial movement relative to the bearing part, and the fastening member permits the pivot shaft to move axially into the bearing part when an axial force exceeding a frictional force acting between the pivot shaft and the fastening member is exerted on the pivot shaft.

When an excessively large external axial force exceeding the frictional force acting between the pivot shaft and the fastening member is exerted on the pivot shaft holding the wiper arm, the pivot shaft is moved axially into the pivot holder to absorb an impact force applied to the pivot shaft, so that damage to a main part of the windshield wiping unit and to the panel holding the pivot holder and forming the body of the vehicle, can be limited to the least unavoidable extent.

When an axial force exceeding an upper limit force corresponding to the fracture strength of the retaining member is exerted on the pivot shaft, the retaining member is fractured or deformed to release the pivot shaft for axial movement relative to the pivot holder. Then, the pivot shaft is pushed axially into the pivot holder. The fastening member functions as part of an axial movement control means which permits the pivot shaft to move axially by a predetermined distance and reduces the acceleration of the pivot shaft as the pivot shaft is moved axially.

A conventional windshield wiper device having a windshield wiping unit comprising a pivot shaft and a pivot holder is provided with a restraining mechanism which does not permit the pivot shaft to move easily in an axial direction relative to the pivot holder even if a large axial force is exerted on the pivot shaft. However, the axial load applied to the pivot shaft during the normal operation of the windshield wiper device is small as compared with a radial load applied to the same. Therefore, the fracture strength of the retaining member according to the invention may be relatively low.

Thus, according to the invention the pivot shaft is supported for turning during the normal operation of the windshield wiper device, the retaining member is fractured or deformed when a relatively small axial force is exerted on the pivot shaft to permit the pivot shaft to move axially relative to the pivot holder, and one end part of the pivot shaft projecting from the pivot holder is forced into the pivot holder.

If the vehicle collides against an obstacle and the body is deformed to exert a force exceeding a force corresponding to the fracture strength of the retaining member on the pivot shaft, the pivot shaft is forced into the pivot holder, the axial movement control means absorbs shocks exerted on the pivot shaft upon the collision of the vehicle against the obstacle to prevent damaging structural members of the vehicle around the pivot shaft. If the pivot shaft is thus moved axially into the pivot holder, the base end of the wiper arm is lowered and the length of projection of the pivot shaft is reduced, so that there is no possibility that the projected pivot shaft causes damage to other portions of the vehicle body.

In the windshield wiper device according to a fourth aspect of the present invention, the axial movement control means may comprise a support member having a cylindrical shape, pressed in and held in place by a predetermined holding force in the axial bore of the pivot holder with its end surface spaced from the retaining member, and supporting the pivot shaft for turning.

After the pivot shaft has been released from restraint laid thereon by the retaining member, the support member moves together with the pivot shaft to retard the axial movement of the pivot shaft. Thus, the axial movement control means has a simple construction.

In the windshield wiper device in any one of the first, the second, the third and the fourth aspects of the present invention, the wiper arm fixed to the free end part of the pivot shaft may move together with the pivot shaft when the pivot shaft moves axially.

After the pivot shaft has been released from restraint laid thereon by the retaining member, the pivot shaft is pressed axially into the pivot holder, and the wiper arm moves together with the pivot shaft so that the length of a part of the windshield wiping unit projecting from the pivot holder is reduced. Therefore the pivot shaft will not fall off the pivot holder, the wiper arm is not separated from the pivot shaft, and hence the pivot shaft and the wiper arm are not scattered.

In the windshield wiper device according to the fourth aspect of the present invention, the wiper arm may be provided with a cylindrical skirt surrounding an outer end part of the pivot shaft, and the pivot holder may be provided with a boss to be received in the skirt in a final stage of the axial movement of the pivot shaft into the axial bore of the pivot holder.

The skirt of the wiper arm surrounding the pivot shaft improves the waterproof characteristics and the appearance of the windshield wiping unit. The boss of the pivot holder is received in the skirt of the wiper arm in a final stage of the axial movement of the pivot shaft together with the wiper arm. Therefore, the skirt does not collide against the boss and the pivot shaft is able to move axially through the predetermined distance with out being obstructed.

In the windshield wiper device according to the fourth aspect of the present invention, the wiper arm may be provided with a cylindrical skirt surrounding an outer end part of the pivot shaft and provided in its end edge with notches arranged at angular intervals.

Since the skirt of the wiper arm is provided with the notches, the parts of the skirt provided with the notches are weak parts having a reduced strength. If the skirt collides against the boss of the pivot holder in a final stage of the axial movement of the pivot shaft together with the wiper arm, the weak parts of the skirt are broken or deformed to permit the pivot shaft to move axially through the full distance of axial movement.

The windshield wiper device according to the fourth aspect of the present invention may further comprise a driving mechanism for rotatively driving the pivot shaft, comprising a turning lever having one end fixed to a base end part of the pivot shaft, a driving means fixedly mounted on the body of the vehicle, and a bar link connecting the other end of the turning lever to the driving means, wherein the bar link is connected the other end of the turning lever for turning relative to the turning lever by a ball-and-socket joint.

The bar link connected to the turning lever fixed to the pivot shaft is driven for reciprocation by the driving means fixed to the body of the vehicle to turn the pivot shaft.

The bar link is connected directly or indirectly to the driving means fixed to the body of the vehicle, and the pivot shaft is connected through the turning lever to the bar link, i.e., a member supported on the body of the vehicle. Therefore, it is possible that the pivot shaft cannot be released from restraint thereon to which restrains the pivot shaft from axial movement, when an axial force is exerted on the pivot shaft because a reaction force from the turning lever acts against the axial force exerted on the pivot shaft. Since the bar link and the turning lever are joined together by the ball-and-socket joint, the turning lever and the bar link are able to incline in optional directions, the pivot shaft can be moved axially by the axial force, and one end of the turning lever is able to move together with the pivot shaft. Thus, the bar link does not exert any reaction force on the pivot shaft when the axial force is exerted on the pivot shaft, so that the pivot shaft is able to move axially and smoothly relative to the pivot holder.

BRIEF DESCRIPTION OF THE DRAWINGS

The above and other objects, features and advantages of the present invention will become more apparent from the following description taken in connection with the accompanying drawings, in which:

FIG. 2 is a sectional view of a pivot assembly of a pivot shaft and a pivot holder included in one of a pair of windshield wiping units included in the windshield wiper device shown in FIG. 1:

FIG. 5 is sectional view of the pivot assembly shown in FIG. 3 in a state where the pivot shaft has been forced into the pivot holder by an axial force exerted thereon;

FIGS. 15(A) and 15(B) are a plan view and a sectional view, respectively, of a modification of a retaining member included in the windshield wiper device in the fourth embodiment;

FIGS. 16(A) and 16(B) are a plan view and a sectional view, respectively, of another modification of the retaining member included in the windshield wiper device in the fourth embodiment;

FIG. 18 is a perspective view of a modification of a wiper arm included in the windshield wiper device in the fourth embodiment;

FIG. 20 is a longitudinal sectional view of an essential part of the pivot assembly shown in FIG. 19;

FIG. 22 is a perspective view of a pivot assembly driving mechanism included in a windshield wiper device in a sixth embodiment according to the present invention.

DETAILED DESCRIPTION OF THE PREFERRED EMBODIMENTS

Figure 1:
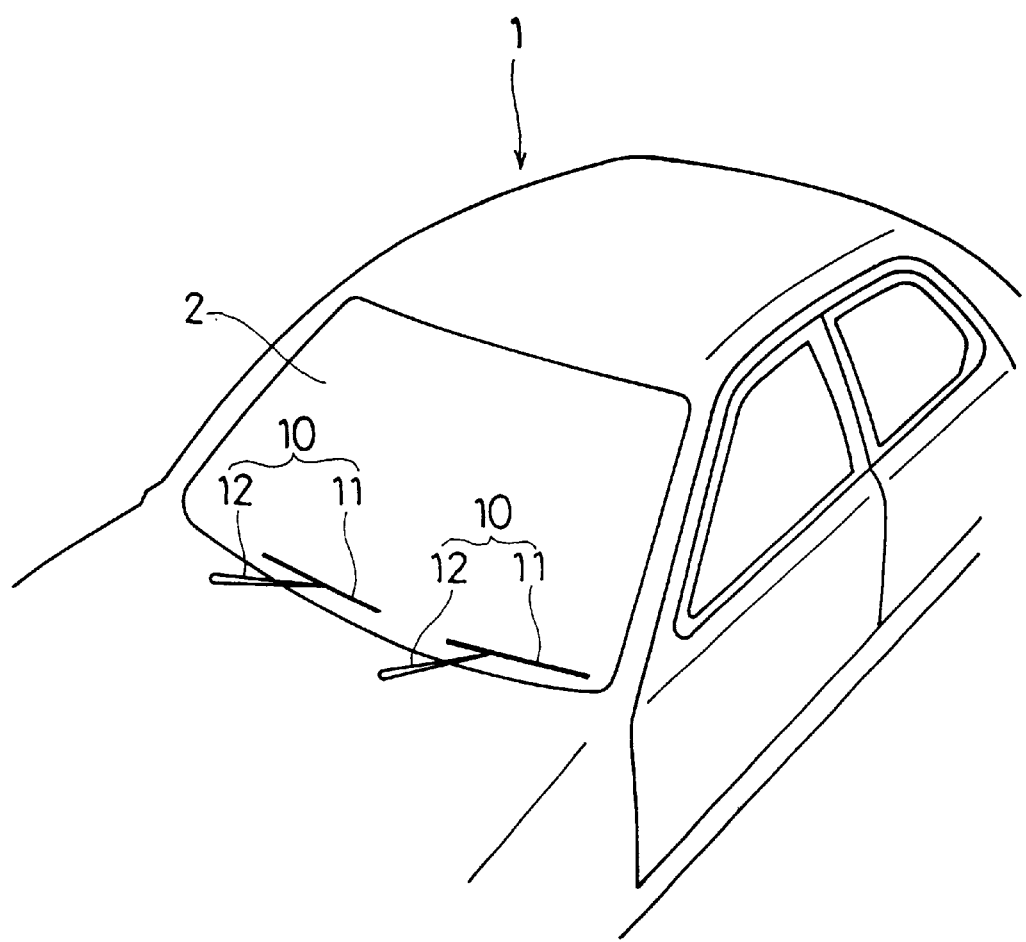
FIG. 1 is a fragmentary perspective view of an automobile provided with a windshield wiper device in a first embodiment according to the present invention.
Figure 3:
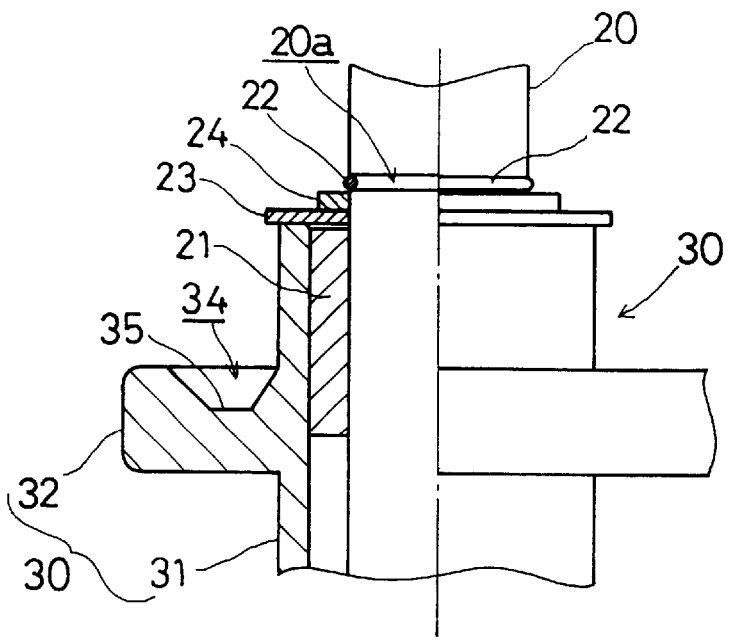
FIG. 3 is a half sectional view of the pivot assembly shown in FIG. 2.

Preferred embodiments of the present invention will be described hereinafter. In the following description, attributive words including upper, lower, upward and downward are used to indicate qualities or conditions as viewed in the drawings.

A windshield wiper device in a first preferred embodiment according to the present invention will be described with reference to FIGS. 1 to 6. The windshield wiper device in the first embodiment has a pair of windshield wiping units 10. The windshield wiper device is applied to wiping the front windshield 2 of an automobile 1 as shown in FIG. 1. One of the windshield wiping units 10 wipes an area of the surface of the windshield 2 on a driver's side and the other windshield wiping unit 10 wipes an area of the surface of the windshield on a passenger's side. The windshield wiping units 10 are substantially the same in function and construction, only one of the windshield wiping units 10 will be described.

The windshield wiping device 10 has a wiper arm 12 and a wiper blade assembly having a wiper blade 11 and connected to the free end of the wiper arm 12. The wiper arm 12 is oscillated about a center of oscillation located near the lower edge of the windshield 2 to clear the windshield 2 of raindrops and foreign matters with the wiper blade 11 to secure satisfactory visibility.

Referring to FIG. 2, a serrated tapered end part of a pivot shaft 20 is fixedly fitted in a serrated tapered hole formed in a base end part of the wiper arm 12, and the serrated tapered end part of the pivot shaft 20 is covered with a cap 15. The pivot shaft 20 Is supported for turning on a pivot holder 30. The pivot holder 30 has a cylindrical bearing part 31 for supporting the pivot shaft 20 therein, and a flange 32 formed integrally with the bearing part 31 so as to extend from the outer surface of the bearing part 31. Two sleeves 21 are fitted on upper and lower parts, respectively, of a lower half part of the pivot shaft 20. The outside diameter of the sleeves 21 is slightly greater than the inside diameter of the bearing part 31. The pivot shaft 20 is located coaxially with the bearing part 31 and supported for turning on the bearing part 31 by the sleeves 21.

Figure 4:
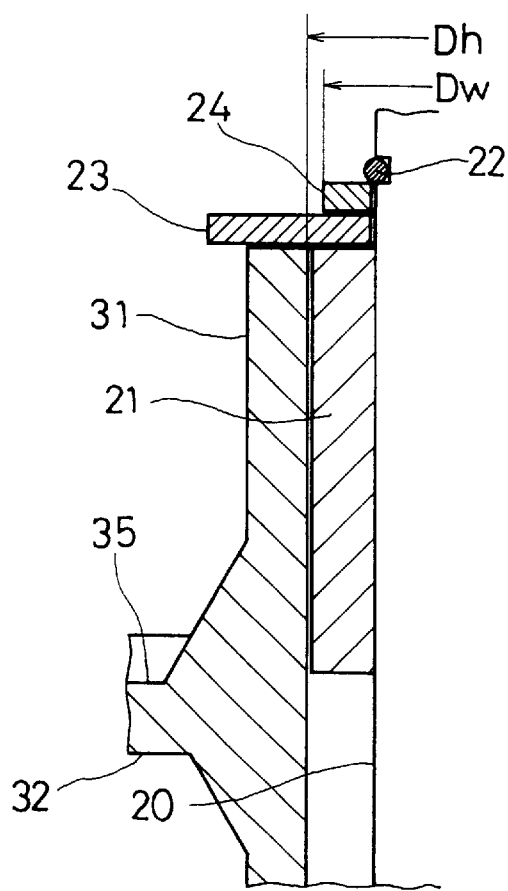
FIG. 4 is an enlarged sectional view of a part of the pivot assembly shown in FIG. 3.

The pivot shaft 20 is provided with an annular groove 20a at a position slightly above the upper end of the upper sleeve 21, and a ring 22 is fitted in the annular groove 20a. A retaining ring 23 is put on the upper end surface of the bearing part 31 of the pivot holder 30. The inside diameter of the retaining ring 23 is approximately equal to the diameter of the pivot shaft 20. The pivot shaft 20 is extended through the retaining ring 23. The retaining ring 23 is formed of a material having a low ductility and a low strength. A washer 24 is interposed between the retaining ring 23 and the ring 22 fitted in the annular groove 20a of the pivot shaft 20. The axial position of the pivot shaft 20 on the pivot holder 30 is determined by the retaining ring 23 and the washer 24. As shown in FIG. 4, the outside diameter $D_w$ of the washer 24 is smaller than the inside diameter $D_h$ of the bearing part 31.

The flange 32 of the pivot holder 30 is provided in its peripheral part with a plurality of holes. The flange 32 is provided in its inner part near the boundary between the flange 32 and the bearing part 31 with an annular recess 34 surrounding the bearing part 31 to form a thin part 35. The bearing part 31 is inserted in an opening formed in a panel 3 forming the body of the vehicle so that the flange 32 rests on the outer surface of the panel 3, bolts 36 are inserted through the holes of the flange 32 and holes formed in the panel 3, and nuts 37 are screwed on the bolts 36 to fasten the flange 32 to the panel 3. A lower end part of the pivot shaft 20 projecting down from the bearing part 31 is connected to a link 27 for turning the pivot shaft 20.

The windshield wiping unit 10 is thus attached to the panel 3. The pivot shaft 20 pivotally supported on the pivot holder 30 is turned through the link 27 to oscillate the wiper arm 12. The surface of the windshield 2 is wiped with the wiper blade 11 of a wiper blade assembly connected to the free end of the wiper arm 12 to clear the windshield 2 of raindrops and such.

Suppose that an external impact force is exerted substantially axially on the base end part of the wiper arm 12. Then, the external impact force is exerted by the cap 15 and the base end of the wiper arm 12 on the pivot shaft 20. Consequently, the ring 22 fitted in the annular groove 20a of the pivot shaft 20 pushes the washer 24, and the washer 24 depresses an inner peripheral part of the retaining ring 23 seated on the upper end surface of the bearing part 31 of the pivot holder 30. Since the outside diameter $D_w$ of the washer 24 is smaller than the inside diameter $D_h$ of the bearing part 31, the inner peripheral part of the retaining ring 23 is pushed into the bearing part 31 by the washer 24. The retaining ring 23 having a low strength is fractured by shear stress. An outer peripheral part of the retaining ring 23 remains on the upper end surface of the bearing part 31, the inner peripheral part of the same is pushed into the bearing part 31 and, consequently, the pivot shaft 20 falls inside the panel 3 of the body such as shown in FIG. 5. Thus, the impact force is absorbed to limit damage to the principal components of the windshield wiping unit 10 to the panel 3 holding the pivot holder 30 to the least unavoidable extent. Since only the retaining ring 23 is broken, the windshield wiping unit 10 can easily be repaired simply by replacing the broken retaining ring 23 with a new one, and the wiper arm 12, the wiper blade assembly including the wiper blade 11 and the pivot holder 30 need not be changed.

Figure 6:
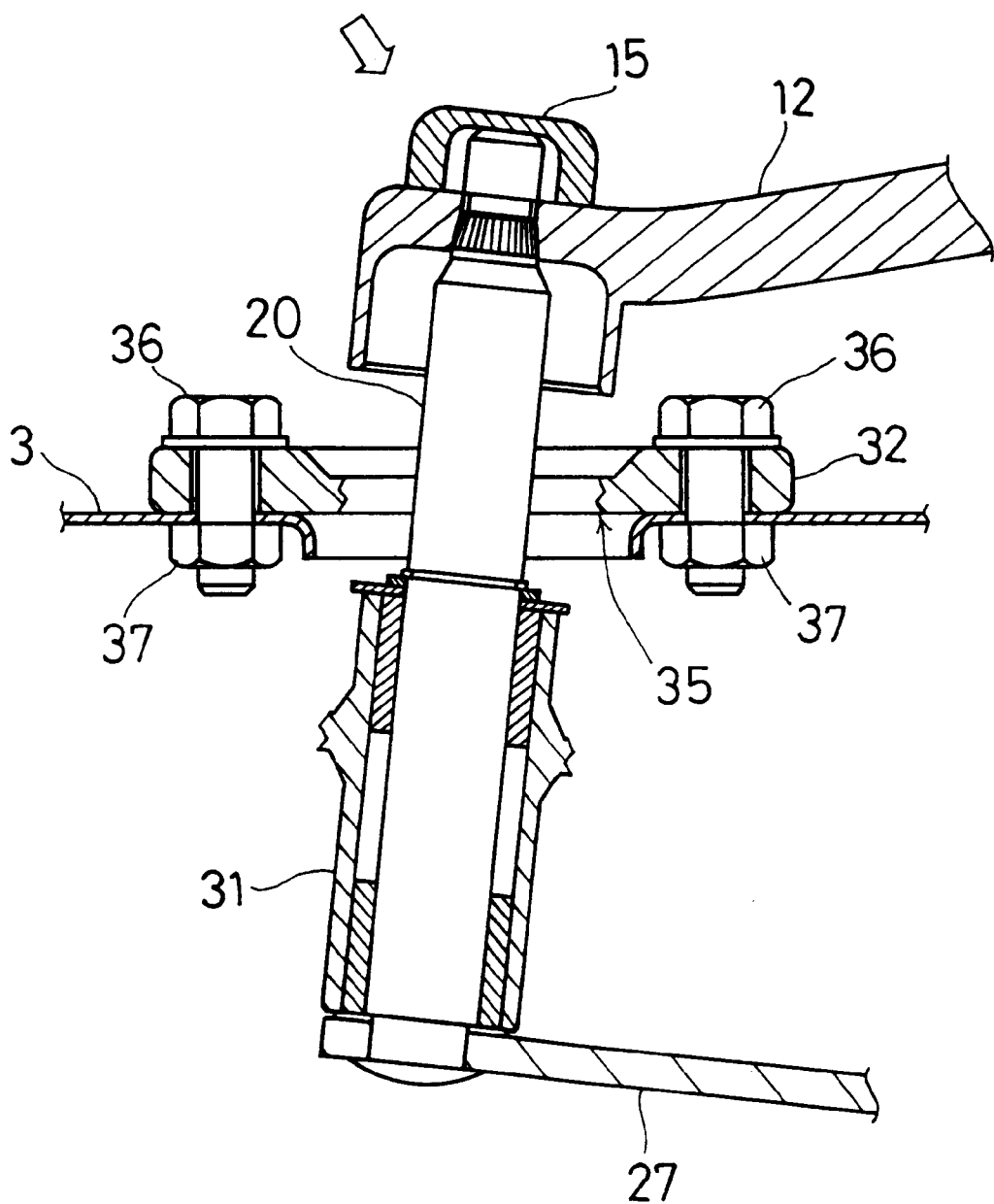
FIG. 6 is a sectional view of the pivot assembly shown in FIG. 3 in a state where the pivot holder has been broken and forced into the body of the vehicle by a force obliquely exerted on the pivot shaft.

If an impact force is exerted obliquely to the pivot shaft 20, any force capable of effectively fracturing the retaining ring 23 by shear stress does not act on the retaining ring 23, but a force acts on the bearing part 31 of the pivot holder 30. Consequently, the thin part 35 of the flange 32 is fractured by the concentration of stress thereon, and the bearing part 31 falls inside the panel 3 of the body as shown in FIG. 6. In this case, since only the flange 32 of the pivot holder 31 is broken, the windshield wiping unit 10 can easily be repaired simply by replacing the pivot holder 30 with a new one, and the wiper arm 12 and the wiper blade assembly including the wiper blade 11 need not be changed.

When the fracture stress necessary for fracturing the thin part 35 of the flange 32 is greater than a shearing stress necessary for fracturing the retaining ring 23, the impact force exerted on the pivot shaft 20 is absorbed by the fracture of the retaining ring 23 by shearing stress when impact force is relatively low, and the impact force is absorbed in two stages, i.e., a first stage where the retaining ring 23 is fractured by shear stress and a second stage where the thin part 35 of the flange 32 is fractured. Thus, the impact force exerted on the pivot shaft 20 can effectively and efficiently be absorbed by permitting the pivot shaft 20 to fall inside the panel 3 of the body.

Figure 7:
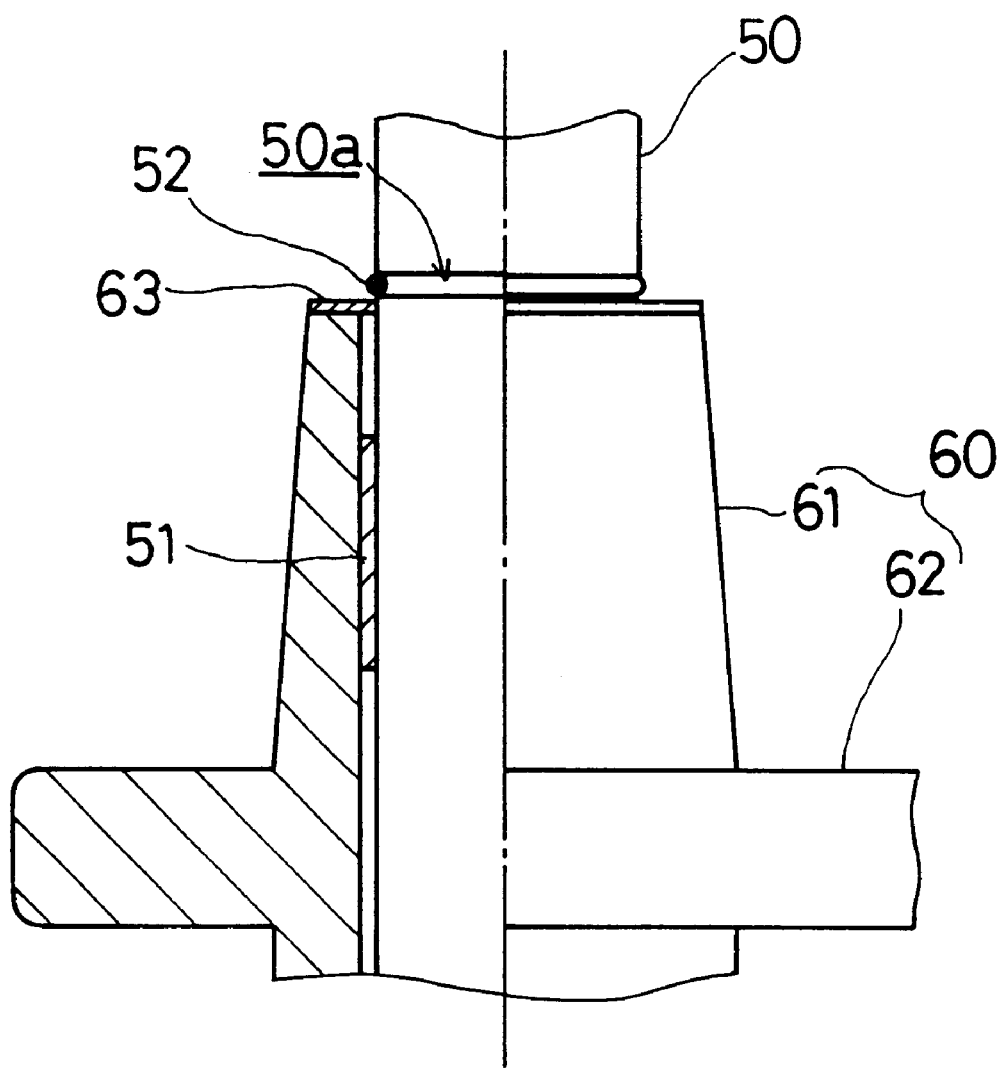
FIG. 7 is a half sectional view of a pivot assembly of a pivot shaft and a pivot holder included in a windshield wiper device in a second embodiment according to the present invention.

A windshield wiper device in a second preferred embodiment according to present invention will be described with reference to FIGS. 7 and 8. The windshield wiper device has at least one windshield wiping unit. The windshield wiping unit includes a pivot holder 60 having a cylindrical bearing part 61 and a flange 62 formed integrally with the bearing part 61 and attached to a panel forming the body of a vehicle and, and a pivot shaft 50 supported for turning on the bearing part 61. A sleeve 51 is fitted on a predetermined part of the pivot shaft 50 inserted in the bearing part 61. The pivot shaft 50 is located coaxially with the bearing part 61 and supported for turning on the bearing part 61 by the sleeve 51. An annular groove 50a is formed in the pivot shaft 50 at a predetermined position slightly above the upper end of the sleeve 51, and a ring 52 is fitted in the annular groove 50a so as to protrude partly from the annular groove 50a. A retaining ring 63 is put on the upper end surface of the bearing part 61 of the pivot holder 60. The inside diameter of the retaining ring 63 is approximately equal to the diameter of the pivot shaft 50. The pivot shaft 50 is extended through the retaining ring 63. The retaining ring 63 is formed of a ductile material having a low rigidity. The ring 52 fitted in the annular groove 50a of the pivot shaft 50 rests on the retaining ring 63 to determine the axial position of the pivot shaft 50 on the pivot holder 60. Thus, the pivot shaft 50 is turnable relative to the bearing part 61.

Figure 8:
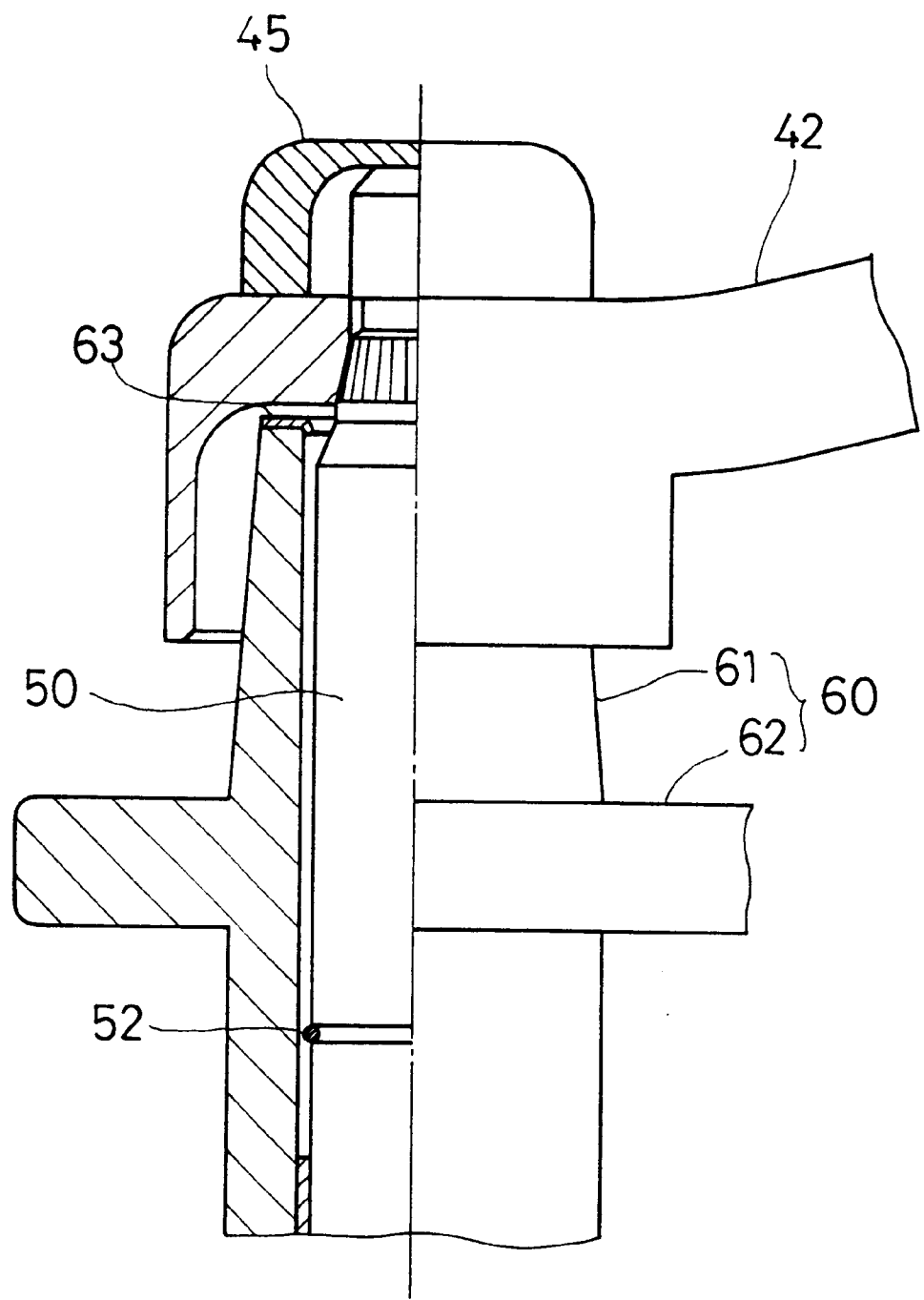
FIG. 8 is a half sectional view of the pivot assembly shown in FIG. 7 in a state where the pivot shaft has been forced into the pivot holder by an axial force exerted thereon.

Suppose that an external impact force is exerted substantially axially on the base end part of the wiper arm 42 (see FIG. 8). Then the external impact force is exerted by a cap 45 and the base end of the wiper arm on the pivot shaft 50. Consequently, the ring 52 fitted in the annular groove 50a of the pivot shaft 50 pushes against an inner peripheral part of the retaining ring 63 seated on the upper end surface of the bearing part 61 of the pivot holder 60 such that the inner peripheral part of the retaining ring 63 is pushed into the bearing part 61 by the ring 52. Consequently, the inner peripheral part of the retaining ring 63 having a low rigidity is bent downwardly, increasing the inside diameter of the retaining ring 63 and the pivot shaft falls inside the panel 3 of the vehicle body. Thus the impact force is absorbed to limit damage to the principal components of the windshield wiping unit 10 and to the panel 3 holding the pivot holder 50 to the least unavoidable extent. Since only the retaining ring 63 is deformed, the windshield wiping unit can easily be repaired simply by replacing the deformed retaining ring 63 with a new one, and the pivot holder 60 and the wiper arm 42 need not be changed. As will be understood, the nature of the deformation of the retaining ring 63 according to the second embodiment is different than that of the retaining ring 23 in the first embodiment, i.e., the ring 23 deforms by fracturing, while the ring 63 deforms by bending, but the same desirable effects are achieved in both embodiments.

Figure 9:
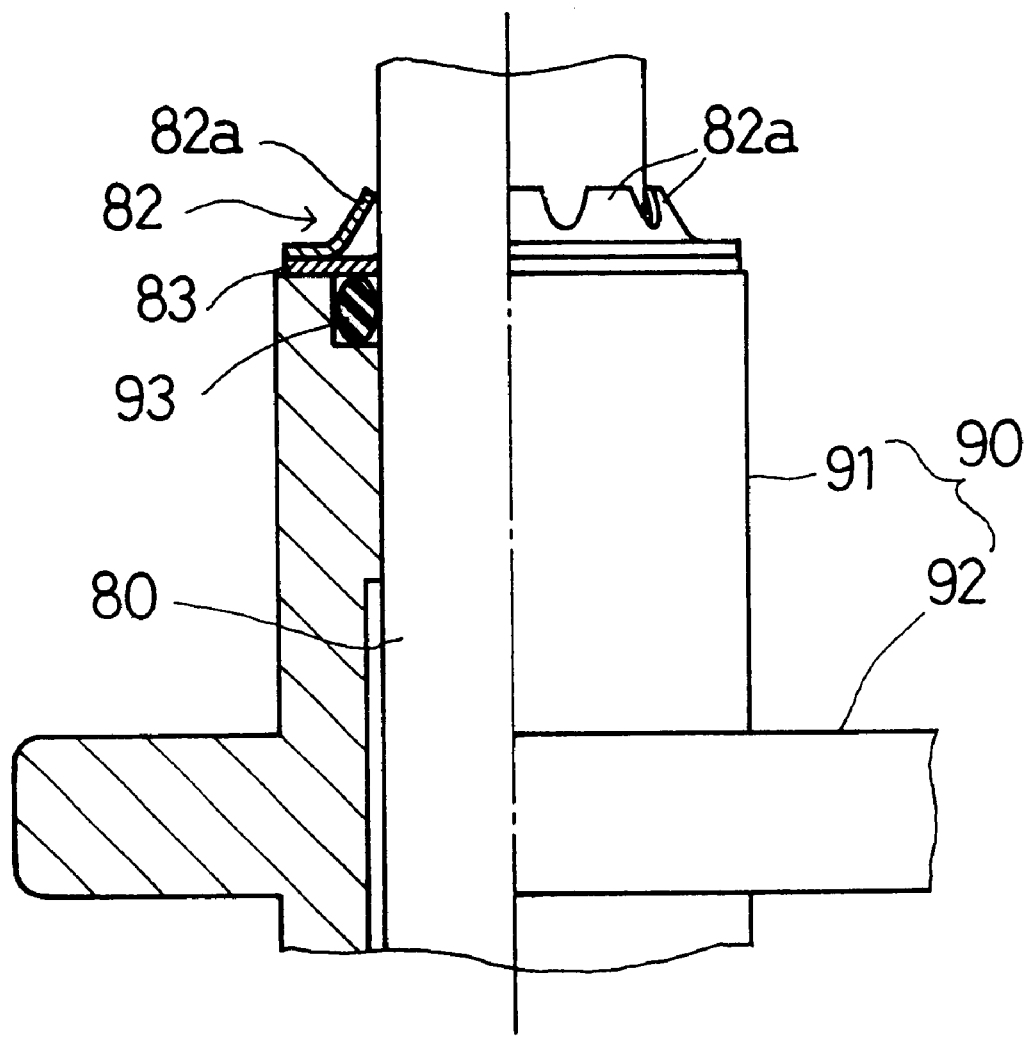
FIG. 9 is a half sectional view of a pivot assembly of a pivot shaft and a pivot holder included in a windshield wiper device in a third embodiment according to the present invention.
Figure 10:
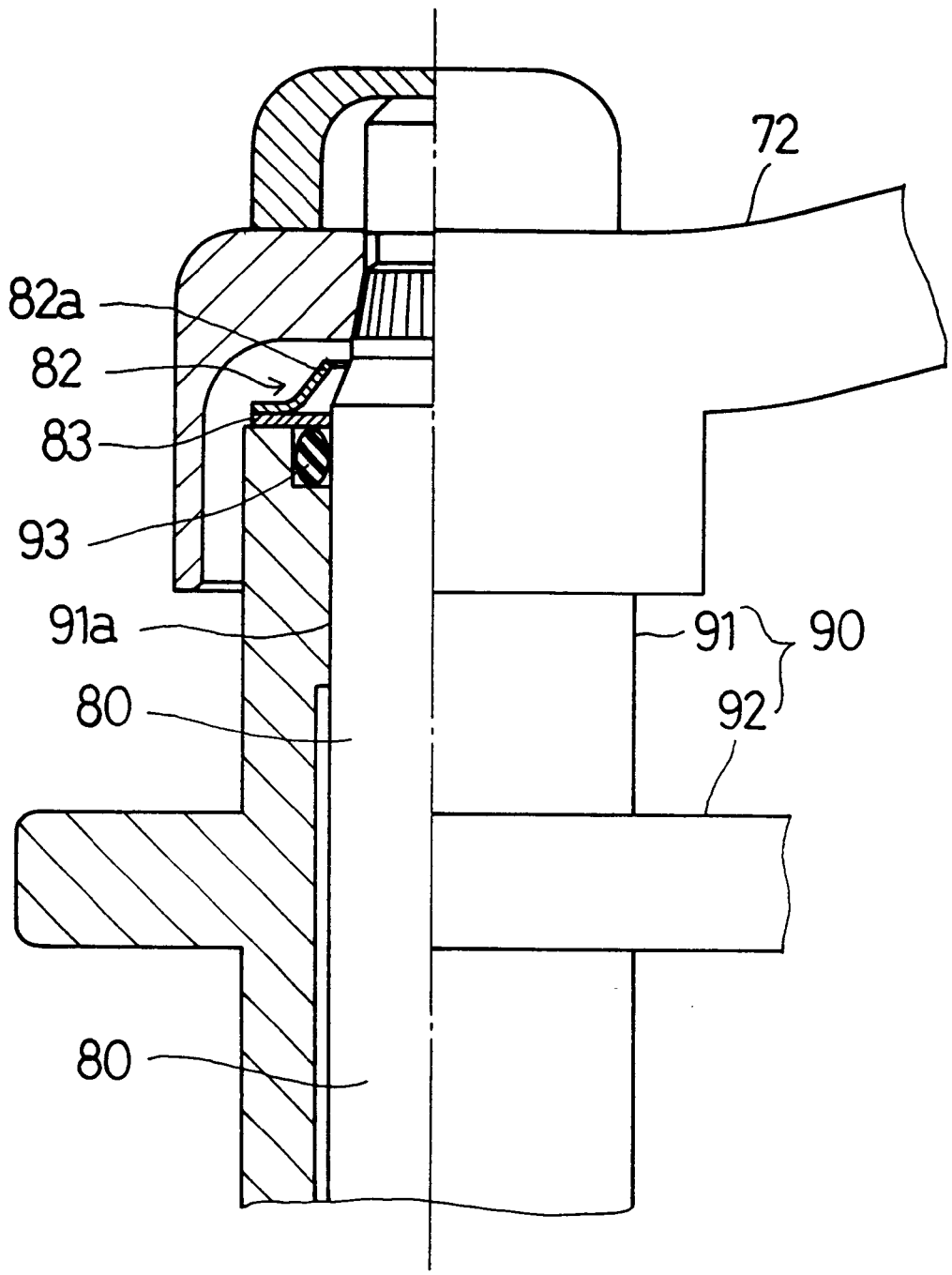
FIG. 10 is a half sectional view of the pivot assembly shown in FIG. 9 in a state where the pivot shaft has been forced into the pivot holder by an axial force exerted thereon.

A windshield wiper device in a third preferred embodiment according to present invention will be described with reference to FIGS. 9 and 10. The windshield wiper device has at least one windshield wiping unit. The windshield wiping unit includes a pivot holder 90 having a cylindrical bearing part 91 and a flange 92 formed integrally with the bearing part 91 and attached to a panel forming the body of a vehicle, and a pivot shaft 80 supported for turning on the bearing part 91. Reduced parts 91a of a diameter approximately equal to that of the pivot shaft 80 are formed at predetermined upper and lower parts of the inner surface of the bearing part 91. The pivot shaft 80 is located coaxially with the bearing part 91 and supported for turning on the bearing part 91. A clasping member or a toothed washer 82 is put on a predetermined part of the pivot shaft 80. The toothed washer 82 rests on a washer 83 put on the upper end surface of the bearing part 91 to determine the axial position of the pivot shaft 80 relative to the bearing part 91 and to restrain the pivot shaft 80 from axial movement into the bearing part 91. A sealing ring 93 is fitted in a recess formed in the open upper end of the bearing part 91. The toothed washer 82 is provided with a plurality of elastic inner teeth 82a. The toothed washer 82 holds to the pivot shaft 80 by the resiliency of the inner teeth 82a, and is held in place by a frictional force produced by the resiliency of the inner teeth 82a.

Suppose that an external impact force is exerted substantially axially on the base end part of a wiper arm 72 (see FIG. 10) and an axial force exceeding a predetermined level acts on the pivot shaft 80. Consequently, the pivot shaft 80 is forced to move axially downward against the frictional force acting between the toothed washer 82 and the pivot shaft 80. Thus the impact force is absorber to limit damage to the principal components of the windshield wiping unit and to the panel of the vehicle body holding the pivot holder 90 to the least unavoidable extent. As will be understood, the toothed washer 82 is a type of retaining member, and its elastic teeth 82a are slightly deformed as the pivot shaft is forced downwardly through the washer. The extent of the deformation of the washer 82 according to the third embodiment is less than that of the retaining ring 23 in the first embodiment or the retaining ring in the second embodiment, but the same desirable effects are achieved in all three embodiments.

Figure 11:
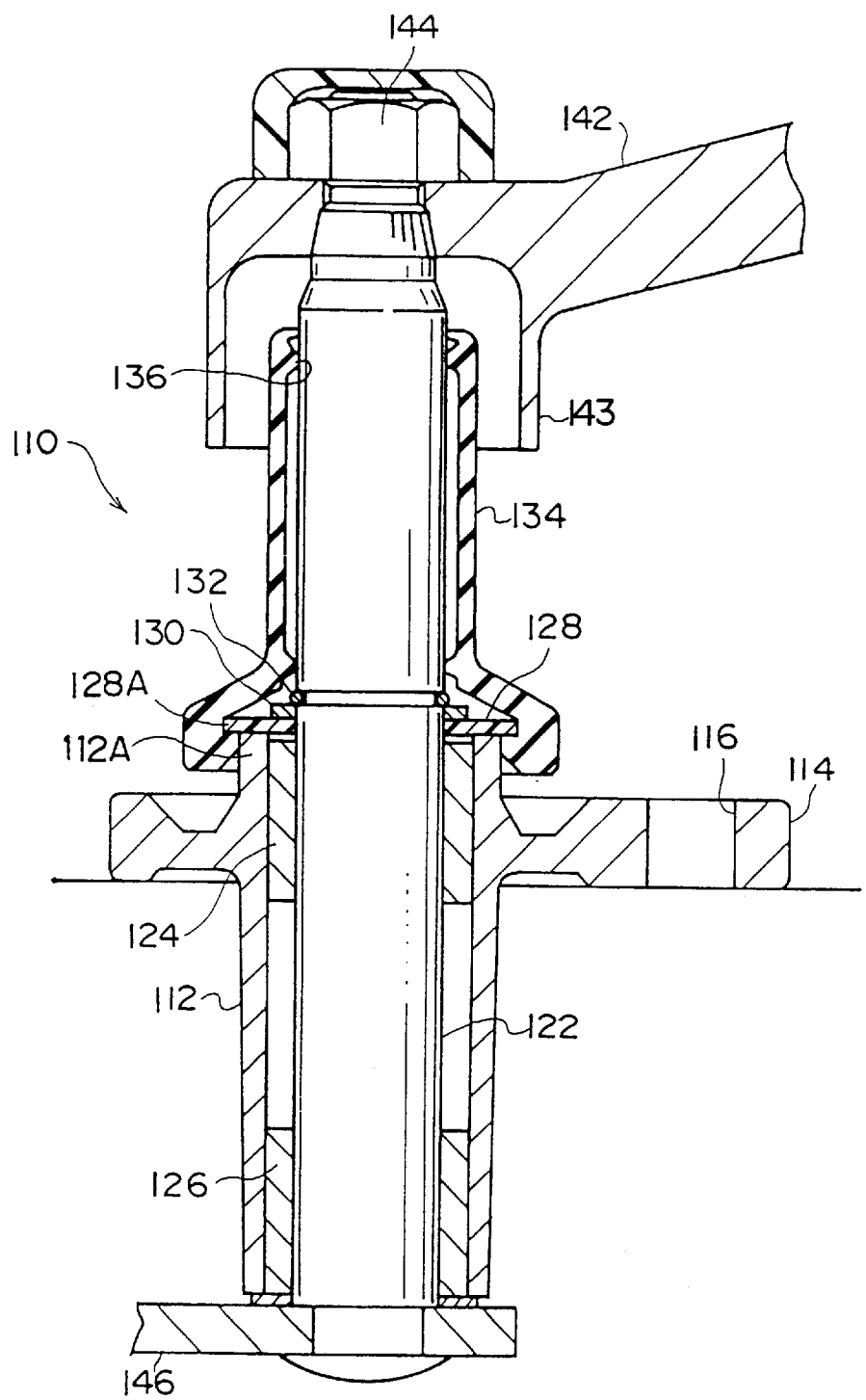
FIG. 11 is a longitudinal sectional view of a pivot assembly of a pivot shaft and a pivot holder included in a windshield wiper device in a fourth embodiment according to the present invention.

A windshield wiper device in a fourth preferred embodiment according to the present invention will be described with reference to FIGS. 11–14. The windshield wiper device in the fourth embodiment has at least one windshield wiping unit. The windshield wiping unit has a pivot assembly 110 as shown in FIG. 11. The pivot assembly 110 comprises a pivot holder 112 provided with a flange 114, and a pivot shaft 122 supported on the pivot holder 112. The pivot holder 112 is formed of an aluminum alloy by die casting. The flange 114 is provided with holes 116. The pivot holder 112 is fixed to a panel forming the body of a vehicle with bolts inserted through the holes 116 and holes formed in the panel and nuts screwed on the bolts.

The pivot shaft 122 is supported for turning on the pivot holder 112 by an upper sleeve 124 and a lower sleeve 126, which serve as an axial movement control means. The upper sleeve 124 is pressed in an upper end part 112A of a cylindrical body of the pivot holder 112 so that the upper end surface thereof is sunk beneath a plane including the upper end surface of the cylindrical body. The upper sleeve 124 is held in place on the surface of a bore 113 formed in the cylindrical body of the pivot holder 112 by a holding force $P_2$. When the pivot shaft 122 is released from restraint laid thereon by a retaining ring 128 to restrain the pivot shaft from axial movement, which will be described later, the upper sleeve 124 permits the pivot shaft 122 to move axially by a predetermined distance H and controls the axial movement of the pivot shaft 122. An upper part of the pivot shaft 122 thus supported for turning on the pivot holder 112 by the sleeves 124 and 126 is inserted through a hole, not shown, formed in a cowl panel so as to project outside from the cowl panel.

Figure 12:
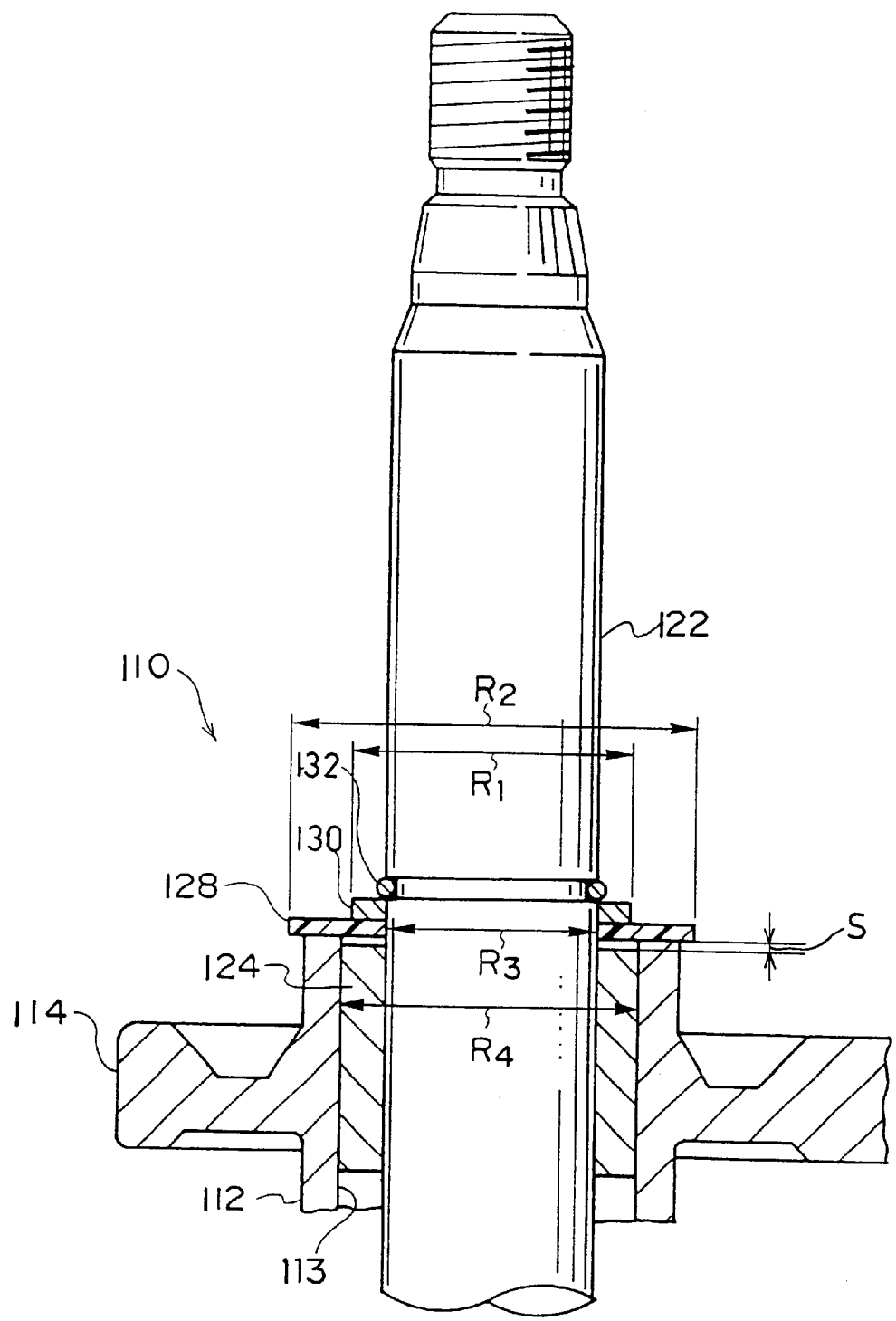
FIG. 12 is an enlarged longitudinal sectional view of the pivot assembly shown in FIG. 11.

Referring to FIG. 12, the retaining ring 128 and a washer 130 are placed in that order on the upper end surface of the pivot holder 112 corresponding to a middle part of the pivot shaft 122. The retaining ring 128 is spaced a distance S from the upper sleeve 124, and has an outside diameter greater than that of the upper end part 112A of the cylindrical body of the pivot holder 112. A snap ring 132 fitted in an annular groove formed in a middle part of the pivot shaft 122 rests on the washer 130. Thus, the pivot shaft 122 is restrained from axially moving into the pivot holder 112 by the retaining ring 128 and the washer 130. The outside diameter $R_1$ of the washer 130, the outside diameter $R_2$ of the retaining ring 128, the inside diameter $R_3$ of the retaining ring 128 and the diameter $R_4$ of the bore 113 of the pivot holder 112 meet the relation expressed by: $R_2 > R_4 > R_1 > R_3$.

The retaining ring 128 withstands a force resulting from an axial force P exerted on the pivot shaft 122 until the axial force P exceeds a predetermined upper limit force $P_1$, such as a force in the range of 980 to 3920 N. When the axial force P exceeds the predetermined upper limit force $P_1$, the retaining ring 128 is fractured or deformed to release the pivot shaft 122 so that the pivot shaft 122 is able to move axially relative to the pivot holder 112. The holding force $P_2$ of the upper sleeve 124 is, for example, 490 N and the upper limit force $P_1$ is higher than the holding force $P_2$. The retaining ring 128 has an annular shape and is made of a highly abrasion-resistant, thermoplastic resin having a low strength and low temperature-dependent properties, and subject to brittle fracture, such as phenylene sulfide.

A substantially cylindrical cap 134 (see FIG. 11) is put on an upper part of the pivot shaft 122 projecting upward from the pivot holder 112. A lower end part of the cap 134 holds fast to the outer surface of an upper end part of the pivot holder 112 and is engaged with a peripheral part 128A of the retaining ring 128 to hold the cap 134 on the pivot holder 112. The cap 134 is provided on the inner surface of an upper end part thereof with a sealing ridge 136. The sealing ridge 136 is in close sliding contact with the outer surface of the pivot shaft 122. Thus, the cap 134 covers the upper end part of the pivot holder 122 and waterproofs the joint of the pivot holder 112 and the pivot shaft 122.

Figure 13:
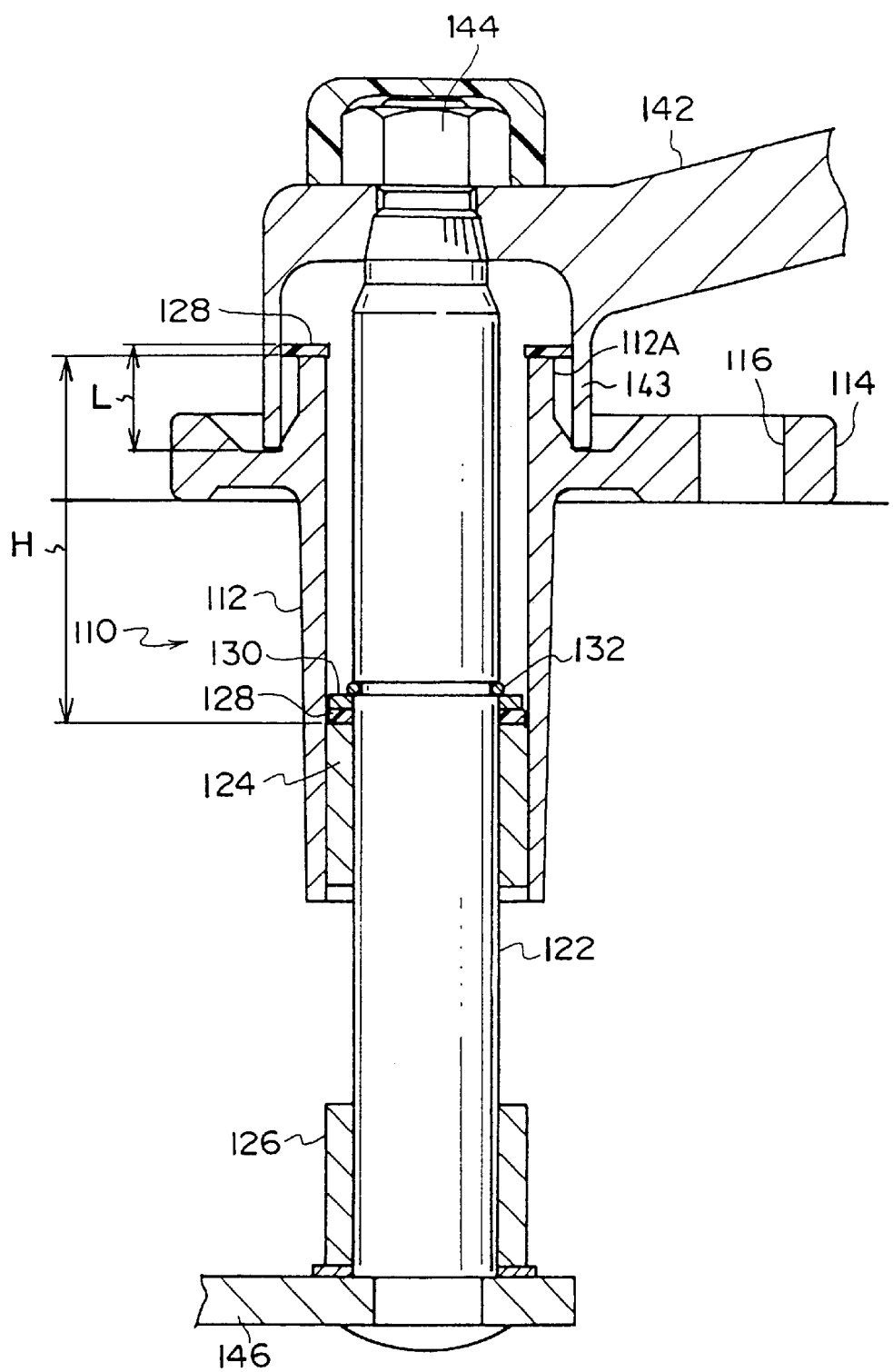
FIG. 13 is a longitudinal sectional view, corresponding to FIG. 11, of the pivot assembly in a state where the pivot shaft has been moved axially relative to the pivot holder.

A base end part of a wiper arm 142 is put on and fastened to a free end part of the pivot shaft 122 of the pivot assembly 110 with a nut 144. The base end part of the wiper arm 142 is provided with a cylindrical skirt 143 surrounding an upper end part of the pivot shaft 122. The wiper arm 142 remains fixed to the free end part of the pivot shaft 122 and moves together with the pivot shaft 122 when the retaining ring 128 is fractured or deformed and the pivot shaft 122 is permitted to move axially relative to the pivot holder 112. When the pivot shaft 122 is moved axially into the pivot holder 112 by a predetermined distance H, the skirt 143 covers the upper end part 112A of the cylindrical body of the pivot holder 112 as shown in FIG. 13.

An arm 146 is attached to a lower end part of the pivot shaft 122, and a wiper driving mechanism, not shown, is connected to the arm 146. The wiper driving mechanism turns the pivot shaft 122 through the arm 146 to oscillate the wiper arm 142 in a predetermined angular range. The arm 146 attached to the pivot shaft 122 comes into contact with the lower end surface of the pivot holder 112 and serves as a stopper for limiting the upward movement of the pivot shaft 122 relative to the pivot holder 112. Thus, the arm 146 and the retaining ring 128 limits the axial movement of the pivot shaft 122 in opposite directions relative to the pivot holder 112.

In operation, the pivot shaft 122 supported for turning on the pivot holder 112 is turned to oscillate the wiper arm 142 supporting the wiper blade assembly in the predetermined angular range to wipe raindrops off the surface of the windshield. The cap 134 attached to the upper end part of the pivot holder 112 waterproofs the joint of the pivot holder 112 and the pivot shaft 122, and hence water is unable to leak into the pivot holder 112. The lower end part of the cap 134 holds fast to the outer surface of an upper end part of the pivot holder 112 and is engaged with the peripheral part 128A of the retaining ring 128 to hold the cap 134 on the pivot holder 112. Thus, the cap 134 is held on the upper end part of the pivot holder 112 by its own fastening force and the holding action of the retaining ring 128 placed on the upper end surface of the pivot holder 112. Therefore, the cap 134 will not readily come off the pivot holder 112 and remains on the pivot holder 112 to exercise its waterproof function even if its fastening force is reduced due to the deterioration thereof.

The retaining ring 128 has a strength sufficient to withstand a force resulting from the axial force below the upper limit force $P_1$ exerted on the pivot shaft 122. The retaining ring 128 is fractured or deformed to permit the pivot shaft 122 to move axially relative to the pivot holder 112 when the axial force P exerted on the pivot shaft 122 exceeds the upper limit force $P_1$. The pivot shaft 122 is pushed together with the sleeve 124 into the pivot holder 112 when released from restraint laid thereon to restrain the same from axial movement by the retaining ring 128. The sleeve 124 controls the axial movement of the pivot shaft 122.

A conventional windshield wiper device has at least one windshield wiping unit comprising a pivot shaft and a pivot holder. The windshield wiping unit is provided with a restraining mechanism which does not permit the pivot shaft to move easily in an axial direction relative to the pivot holder even if a large axial force is exerted on the pivot shaft. However, an axial load applied to the pivot shaft 122 during the normal operation of the windshield wiper device is small as compared with a radial load applied to the same. Therefore, the upper limit force $P_1$ may be relatively low.

Figure 14:
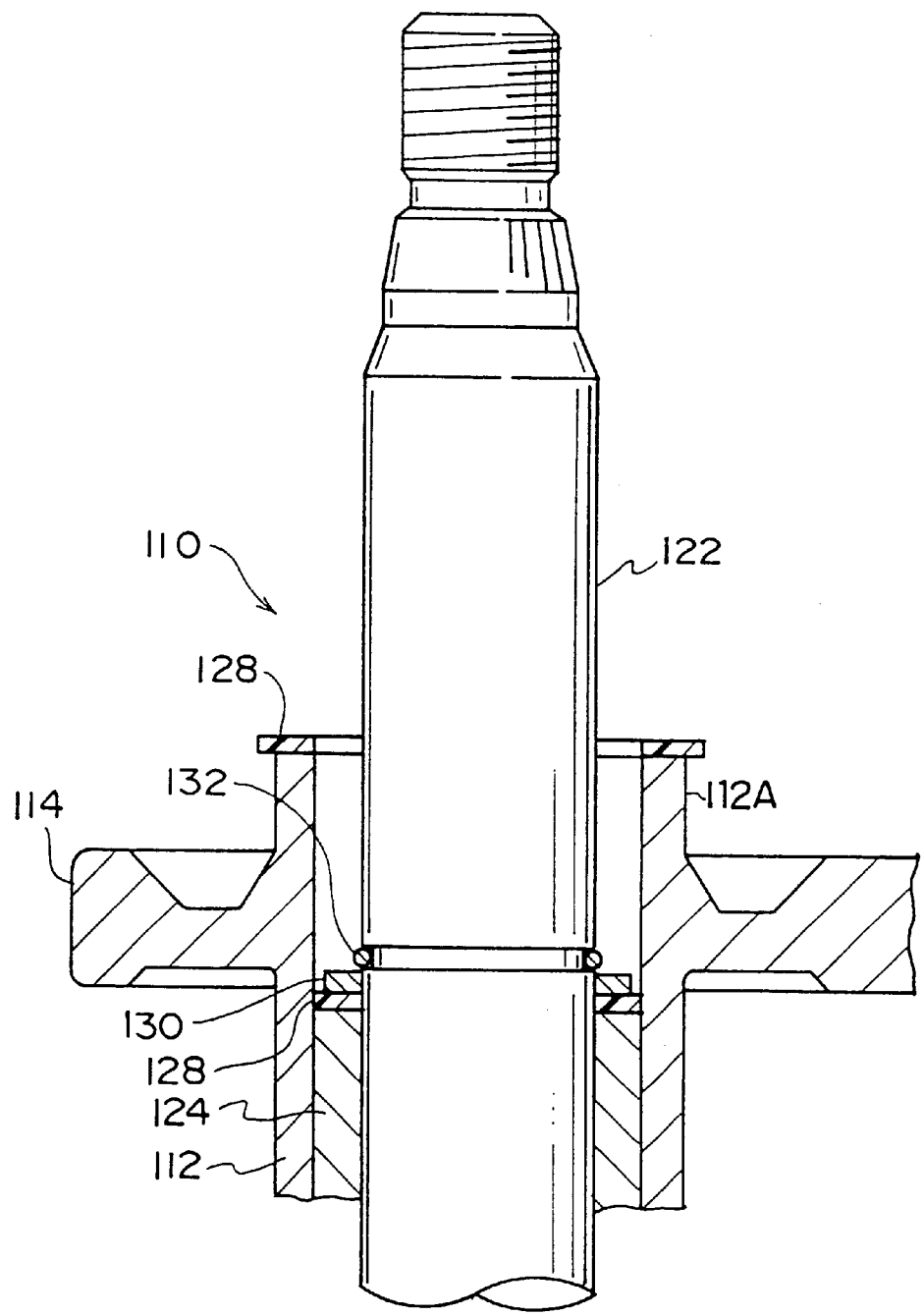
FIG. 14 is a longitudinal sectional view, corresponding to FIG. 12, of the pivot assembly in a state where the pivot shaft has been moved axially relative to the pivot holder.

When the axial force P acting on the pivot shaft 122 exceeds the upper limit force $P_1$ while the windshield wiping unit is operating normally and the pivot shaft 122 is turning without a hitch, the retaining ring 128 is fractured or deformed to release the pivot shaft 122 from restraint laid thereon by the retaining ring 128, and then the pivot shaft 122 is pushed into the pivot holder 112 as shown in FIGS. 13 and 14. In FIG. 13, the cap 134 is omitted. Since the upper limit force $P_1$ is higher than the holding force $P_2$ by which the sleeve 124 fastens itself to the inner surface of the pivot holder 112, the sleeve 124 moves together with the pivot shaft 122. Since the outside diameter $R_1$ of the washer 130, the outside diameter $R_2$ of the retaining ring 128, the inside diameter $R_3$ of the retaining ring 128 and the diameter $R_4$ of the bore 113 of the pivot holder 112 meet the relation expressed by: $R_2>R_4>R_1>R_3$, the pivot shaft 122 is able to move smoothly and axially into the bore 113 of the pivot holder 112 after the same has been released from restraint laid thereon by the retaining ring 128.

When the body of the vehicle is deformed due to, for example, the collision of the vehicle against an obstacle and the axial force P, which may be a component of a force actually exerted on the pivot shaft 122, acting on the pivot shaft 122 exceeds the upper limit force $P_1$, the pivot shaft 122 drops into the pivot holder 112, absorbing an impact exerted thereon. When the pivot shaft 122 thus moves into the pivot holder 112, energy of the force exerted on the pivot shaft 122 is absorbed by the friction between the outer surface of the sleeve 124 and the inner surface of the pivot holder 112, so that the movement of the pivot shaft 122 is controlled and damage in structural members of the vehicle around the windshield wiper unit can be avoided. Since the overall length of the pivot assembly 110 and the height of the base end of the wiper arm 142 are reduced when the pivot shaft 122 moves into the pivot holder 112, there is no possibility that troubles are caused by the projecting members.

The retaining ring 128 and the washer 130 need not be of circular shapes. The washer 130 may be of a polygonal shape inscribed in a circle of a diameter equal to the diameter $R_1$, and the retaining ring 128 may be of a polygonal shape inscribed in a circle of a diameter equal to the diameter $R_2$. When the retaining ring 128 and the washer 130 have the shapes of polygons, and the diameter $R_1$ of the circumscribed circle of the washer 130, the diameter $R_2$ of the circumscribed circle of the retaining ring 128, the inside diameter $R_3$ of the retaining ring 128 and the diameter $R_4$ of the bore 113 of the pivot holder 112 meet the relation expressed by: $R_2>R_4>R_1>R_3$, the waterproof cap 134 can be retained on the upper end part of the pivot holder 112 by the peripheral part of the polygonal retaining ring 128, and the polygonal retaining ring 128 restrains the cap 134 from turning.

The sleeve 124 supporting the pivot shaft 122 for turning is pressed in the bore 113 of the pivot holder 112 and held firmly in place by the holding force $P_2$ with its upper end surface spaced a distance S apart from the retaining plate 128. The upper limit force $P_1$ is higher than the holding force $P_2$. Therefore, the pivot shaft 122 is released and is able to move axially together with the sleeve 124 when the axial force P acting thereon exceeds the upper limit force $P_1$.

If the pivot assembly 110 is disposed, for example, in an environment where temperature varies in a wide range, such as an environment in the vicinity of the engine room of the vehicle, the holding force $P_2$ varies unstably according to the thermal expansion and thermal contraction of the pivot holder 112 and the sleeve 124 pressed in the bore 113 of the pivot holder 112. Since the release of the pivot shaft 122 from restraint on the axial movement of the pivot shaft 122 laid by the retaining ring 128 is dependent on the stable upper limit force $P_1$ corresponding to the fracture strength of the retaining ring 128, however the axial movement of the pivot shaft 122 relative to the pivot holder 112 can stably be controlled.

When the pivot shaft 122 is released from restraint on the axial movement thereof laid by the retaining ring 128, the pivot shaft 122 is pushed axially into the bore 113 of the pivot holder 112, and the wiper arm 142 remains fixed to the free end part of the pivot shaft 122 and moves axially together with the pivot shaft 122 toward the pivot holder 112. Consequently, the pivot shaft 122 is unable to fall completely off the pivot holder 112, and the pivot shaft 122 and the wiper arm 142 are not scattered.

The skirt 143 of the wiper arm 142 surrounding the upper end part of the pivot shaft 122 improves the waterproof ability and the appearance of the windshield wiping unit.

When the pivot shaft 122 is moved axially into bore 113 of the pivot holder 112 by the predetermined distance H, the skirt 143 of the wiper arm 142 covers the upper end part 112A of the cylindrical body of the pivot holder 112. Therefore, the distance H includes an additional distance corresponding to the length of the upper end part 112A, and the pivot shaft 122 and the wiper arm 142 are able to move axially by the sufficient distance H.

The retaining ring 128 employed in the fourth embodiment is preferably a simple, circular, resin washer. The retaining ring 128 may be formed in a shape having a part that is subject to stress concentration and can be fractured by stress concentration when an axial force P exceeding the upper limit force $P_1$ is exerted on the pivot shaft. The shape of the fracturable part of the retaining ring 128 may be so adjusted that stress is concentrated properly thereon.

For example, the windshield wiping unit may employ a retaining ring 128 provided with four holes 138 to form a circular, stress-fracturable part 140 between the holes 138 as shown in FIGS. 15(A) and 15(B). When the axial force P exceeding the upper limit force $P_1$ is exerted on the pivot shaft 122, stress is concentrated on the stress-fracturable part 140 and the stress-fracturable part 140 is fractured or deformed. Therefore, the upper limit force $P_1$ can properly be determined regardless of the thickness of the retaining ring 128 determined in anticipation of abrasion or the material forming the retaining ring 128. The number of the holes 138 need not necessarily be four as shown in FIG. 15(A) and there is no restriction on the number of the holes 138.

The windshield wiping unit may employ a retaining ring 148 provided with an annular recess 150 for forming a thin, stress-fracturable part 152 as shown in FIGS. 16(A) and 16(B). The upper limit force $P_1$ can be determined properly regardless of the thickness of the retaining ring 148 or the material forming the retaining ring 148. The retaining ring 148 may be provided with intermittent annular groove or a groove of any appropriate shape.

Figure 17:
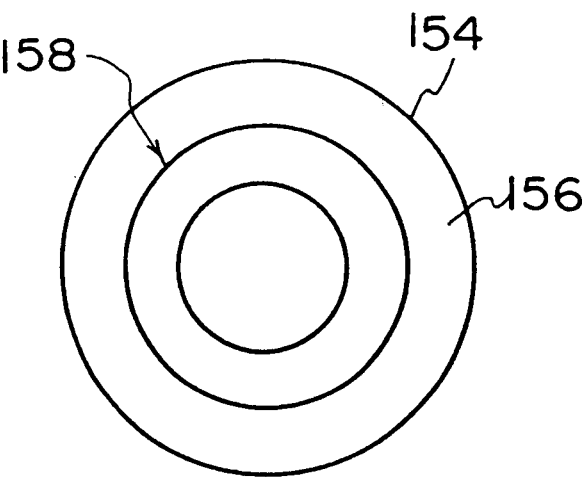
FIGS. 17(A) and 17(B) are a plan view and a sectional view, respectively, of a third modification of the retaining member included in the windshield wiper device in the fourth embodiment.
Figure 17:
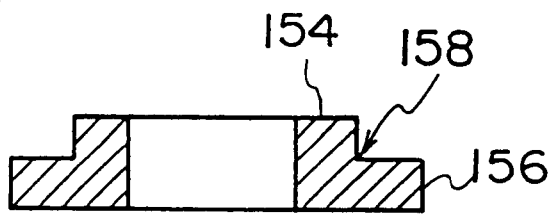

The windshield wiping unit may be provided with a retaining ring 154 as shown in FIGS. 17(A) and 17(B). This retaining ring 154 is formed by removing a part of its peripheral part to form a thin peripheral part 156 terminating in a corner. A part of the retaining ring 154 around the corner serves as a stress-fracturable part 158. The upper limit force $P_1$ can properly be determined.

The windshield wiping unit may employ, instead of the wiper arm 142 having the base end provided with the skirt 143 capable of receiving therein the upper end part 112A of the pivot holder 112 when the pivot shaft 122 is moved axially into the bore 113 of the pivot holder by the predetermined distance H, a wiper arm 168 provided with a skirt 170 provided with notches 172 as shown in FIG. 18. Weak parts are formed around the notches 172 in the skirt 170. If the skirt 170 of the wiper arm 168 collides against the upper end part 112A of the pivot holder 112 as the wiper arm 168 moves axially together with the pivot shaft in the final sage of the axial movement of the pivot shaft 122, the weak parts having the notches 172 are damaged and deformed and the distance by which the pivot shaft 122 is able to move axially together with the wiper arm 168 into the bore 113 of the pivot holder 112 is increased accordingly. The number of the notches 172 need not necessarily be four as shown in FIG. 18 and any suitable number of notches may be formed in the skirt 170 in an appropriate arrangement.

A windshield wiper device in a fifth preferred embodiment according to the present invention will be described, in which parts like or corresponding to those of the windshield wiper device in the fourth embodiment are designated by the same reference characters and the description thereof will be omitted.

Figure 19:
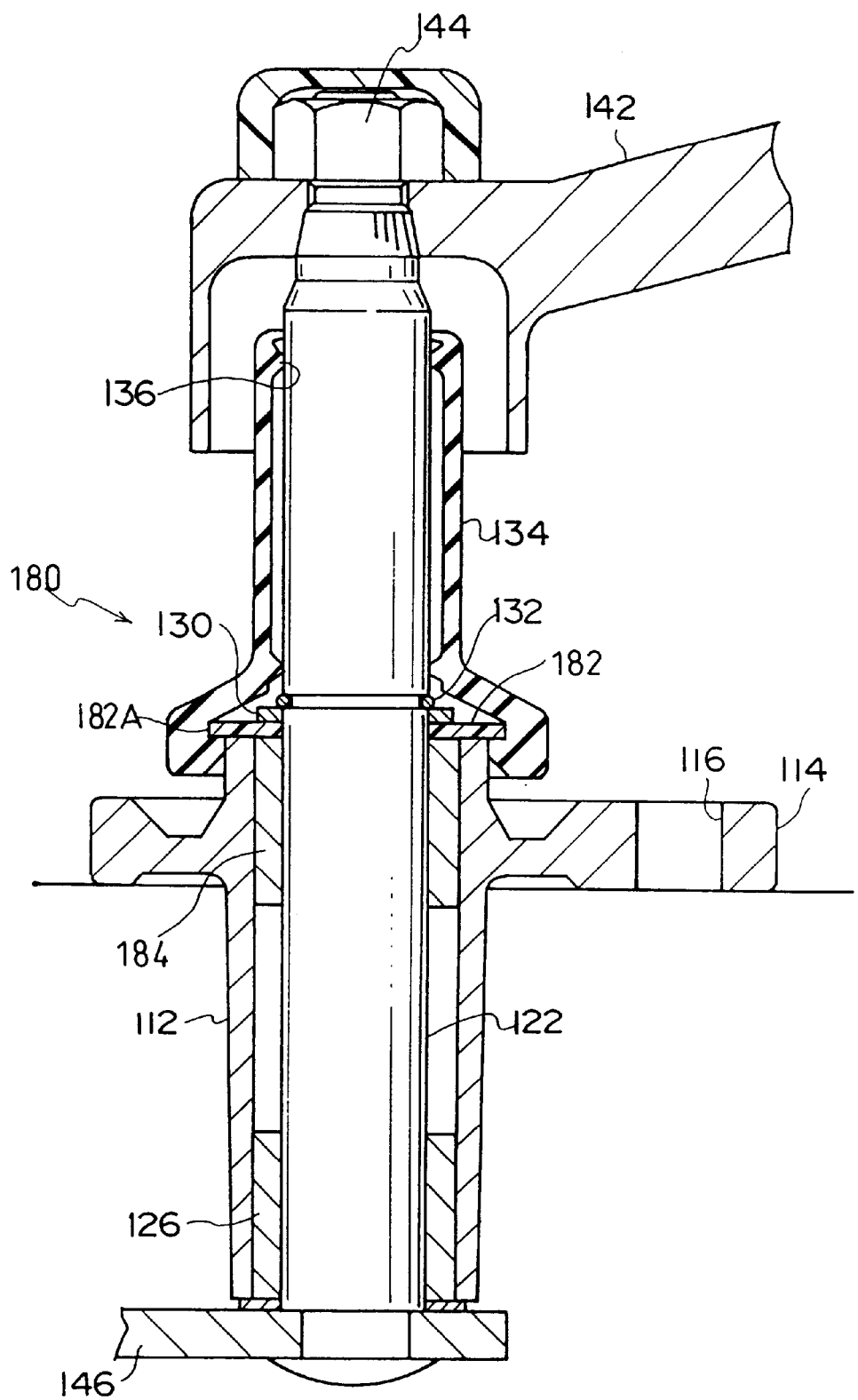
FIG. 19 is a longitudinal sectional view of a pivot assembly of a pivot shaft and a pivot holder included in a windshield wiper device in a fifth embodiment according to the present invention.

Referring to FIGS. 19 and 20 showing a pivot assembly 180 included in a windshield wiping unit of the windshield wiper device in the fifth embodiment, the pivot assembly 180 is provided with a retaining ring 182 and a sleeve 184 instead of the retaining ring 128 and the sleeve 124 of the pivot assembly 110 of the windshield wiping unit in the fourth embodiment. The retaining ring 182 is not fractured while an axial force P exerted on a pivot shaft 122 is below an upper limit force $P_3$ corresponding to the fracture strength of the retaining ring 182. The sleeve 184 is pressed in the bore of a pivot holder 112 and is held firmly in place by a holding force $P_4$ with its upper end surface in contact with the retaining ring 182. When the axial force P exerted on the pivot shaft 122 exceeds the sum of the upper limit force $P_3$ and the holding force $P_4$, the retaining ring 182 is fractured or deformed, and the sleeve 184 is forced to move, so that the pivot shaft 122 is able to move axially relative to the pivot holder 112. The pivot assembly 180 is the same in other respects as the pivot assembly 110 of the windshield wiping unit in the fourth embodiment.

The retaining ring 182 has a fracture strength corresponding to the upper limit force $P_3$. The sleeve 184 is pressed in the bore of the pivot holder 112 and is held firmly in place by the holding force $P_4$. When the axial force P exerted on the pivot shaft 122 exceeds the sum of the upper limit force $P_3$ and the holding force $P_4$, the retaining ring 182 is fractured or deformed to permit the pivot shaft 122 to move axially together with the sleeve d184 relative to the pivot holder 112. As mentioned above, an axial load applied to the pivot shaft 122 during the normal operation of the windshield wiper device is small as compared with a radial load applied to the same. Therefore, the upper limit force $P_3$ and the holding force $P_4$ fastening the sleeve 184 to the pivot holder 112 may be relatively low. When the axial force P acting on the pivot shaft 122 exceeds a predetermined axial force while the windshield wiping unit is operating normally and the pivot shaft 122 is turning without a hitch, the retaining ring 128 is fractured or deformed to release the pivot shaft 122 from restraint laid thereon by the retaining ring 128, and then the pivot shaft 122 is pushed into the pivot holder 112.

When the body of the vehicle is deformed due to, for example, the collision of the vehicle against an obstacle and the axial force P acting on the pivot shaft 122 exceeds the sum of the upper limit force $P_3$ and the holding force $P_4$, the pivot shaft 122 drops into the pivot holder 112, absorbing an impact exerted thereon and damage in structural members of the vehicle around the windshield wiper unit can be avoided. Since the overall length of the pivot assembly 180 and the height of the base end of the wiper arm 142 are reduced when the pivot shaft 122 moves into the pivot holder 112, there is no possibility that troubles are caused by the projecting members.

The retaining ring 182 may be provided with a stress-fracturable part 140 similar to that of the retaining ring 128 employed in the fourth embodiment. The upper limit force $P_3$ can properly be determined regardless of the material forming the retaining ring 182 by selectively designing the shape of the stress-fracturable part 140 to adjust stress concentration on the stress-fracturable part 140 properly.

Figure 21:
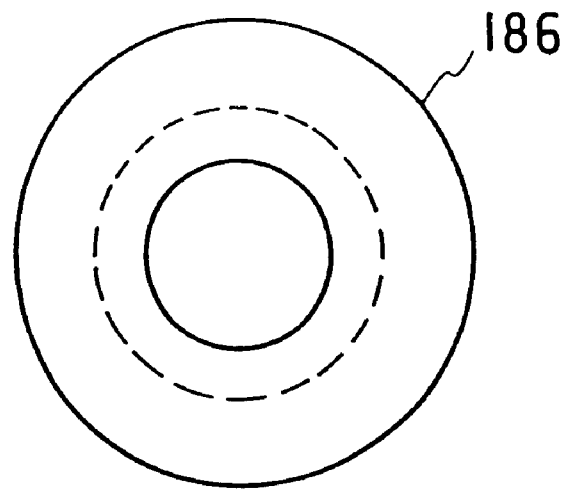
FIGS. 21(A) and 21(B) are a plan view and a sectional view, respectively, of a modification of a retaining member included in the windshield wiper device in the fifth embodiment.
Figure 21:
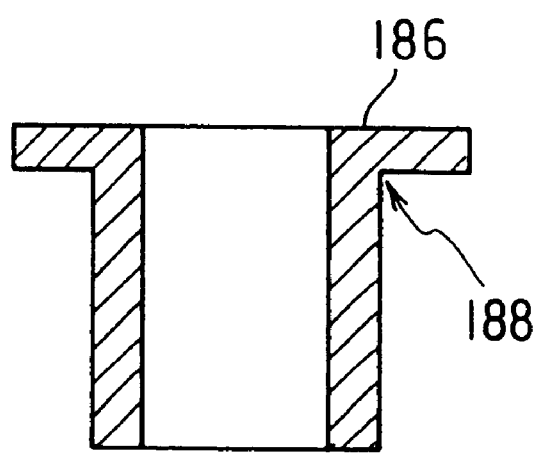

A retaining member 186 integrally having an annular part corresponding to the retaining ring 182, and a cylindrical part corresponding to the sleeve 184 as shown in FIGS. 21(A) and 21(B) may be employed in the fifth embodiment. Stress concentration occurs in a corner 188 of the retaining member 186. The corner 188 of the retaining member 186 is fractured when the axial force P acting on the pivot shaft 122 exceeds the upper limit force $P_3$. The retaining member 186 having the respective functions of both the retaining ring 182 and the sleeve 184 contributes to reducing the number of component parts and the cost of the pivot assembly 180.

FIG. 22 is a perspective view of a windshield wiper device in a sixth embodiment according to the present invention comprising a pair of windshield wiping units, i.e., first and second windshield wiping units, respectively having first and second pivot assemblies 110 substantially the same in function and construction as the pivot assembly 110 employed in the fourth embodiment, and a windshield wiping unit driving mechanism 190. The windshield wiping unit driving mechanism 190 comprises a turning lever 192 attached to a lower end part (base part) of the pivot shaft 122 of the first pivot assembly 110, a turning lever 194 attached to a lower end part (base part) of the pivot shaft 122 of the second pivot assembly 110, a bar link 196 having opposite ends connected to the turning levers 192 and 194, a bar link 198 connected to the joint of the turning lever 194 and one end of the bar link 196, and a driving mechanism connected to the bar link 198, including a wiper motor 200, and fixed to the body of a vehicle.

The turning lever 192 and one end of the bar link 196, and the joint of the turning lever 192 and the bar link 196, and the bar link 198 are joined together by ball-and-socket joints 202, respectively. The wiper motor 200 drives the turning levers 192 and 194 connected to the pivot shafts 122 for oscillation.

Since the bar links 196 and 198 are connected to the driving mechanism including the wiper motor 200 and fixed to the body of the vehicle, it is possible that the pivot shaft 122 cannot be released from restraint laid thereon to restrain the pivot shafts 122 from axial movement because a reaction acts against the force P exerted on the pivot shafts 122 if the pivot shafts 122 are connected simply by the turning levers 192 and 194 to the bar links 196 and 198, respectively.

In the sixth embodiment, the windshield wiping unit driving mechanism 190 employs the ball-and-socket joints 202 to connect the bar links 196 and 198 to the turning levers 192 and 194 to allow the bar links 196 and 198 to incline relative to the turning levers 192 and 194. Therefore, the free end parts of the turning levers 192 and 194 are able to move when the pivot shafts 122 are forced to move into the corresponding pivot holders 112 by the force P exerted thereon. Thus, the pivot shafts 122 are able to move smoothly in an axial direction relative to the pivot holders 112 without encountering a large reaction.

Although the invention has been described in its preferred embodiments with a certain degree of particularity, obviously many changes and variations are possible therein. It is therefore to be understood that the present invention may be practiced otherwise than as specifically described herein with out departing from the scope and spirit thereof.

What is claimed is:

1. A windshield wiper device for a vehicle, comprising at least one windshield wiping unit, said windshield wiping unit comprising:

a pivot holder attached to a body of the vehicle and having a cylindrical bearing part;

a pivot shaft extended through and supported for turning in the bearing part on the pivot holder;

a wiper arm having a base end part fixed to an outer end part of the pivot shaft;

a wiper blade assembly having a wiper blade and connected to a free end of the wiper arm;

a retaining member interposed between the bearing part and the pivot shaft to restrain the pivot shaft from axial movement relative to the bearing part, and the retaining member fractures to permit the pivot shaft to move axially into the bearing part when an axial force exceeding a predetermined level is exerted on the pivot shaft; and the wiper arm being provided with a cylindrical skirt surrounding an outer end part of the pivot shaft, said skirt being provided in its end edge with notches arranged at angular intervals.

2. The windshield wiper device according to claim 1, wherein the bearing part of the pivot holder is provided on its outer surface with a flange attached to the body of the vehicle, the flange has a thin annular part having a reduced fracture strength relative to the rest of the flange and is contiguous with the bearing part, and said flange fractures at said thin annular part to permit said pivot holder to move inwardly of the vehicle body when a sufficiently large force is exerted on the pivot shaft.

3. The windshield wiper device according to claim 1, further including an axial movement control means for permitting the pivot shaft to move axially by a predetermined distance when the retaining member is fractured and for reducing an acceleration of the pivot shaft.

4. The windshield wiper device according to claim 3, wherein the axial movement control means comprises a support member having a cylindrical shape, pressed in and held in place by a predetermined holding force in an axial bore of the pivot holder with its end surface spaced from said retaining member, and supporting the pivot shaft for turning.

5. The windshield wiper device according to claim 1, wherein the retaining member has a predetermined fracture strength.

6. The windshield wiper device according to claim 1, wherein the retaining member has a stress-fracturable part susceptible to stress concentration when an axial force is exerted on the pivot shaft, and fracturable when the axial force exceeds said predetermined level.

7. The windshield wiping device according to claim 1, wherein the wiper arm is provided with a cylindrical skirt surrounding an outer end part of the pivot shaft, and the pivot holder is provided with a boss to be received in the skirt in a final stage of the axial movement of the pivot shaft into the bearing part of the pivot holder.

8. The windshield wiper device according to claim 1 further comprising a driving mechanism for rotatively driving the pivot shaft, comprising:

a turning lever having one end fixed to a base end part of the pivot shaft;

a driving means fixedly mounted on the body of the vehicle; and a bar link connecting another end of the turning lever to the driving means;

wherein the bar link is connected to the other end of the turning lever for turning relative to the turning lever by a ball-and-socket joint.

9. The windshield wiper device according to claim 1, wherein said retaining member fractures into multiple pieces when the axial force exceeding the predetermined level is exerted on the pivot shaft.

10. A windshield wiper device for a vehicle, comprising at least one windshield wiping unit, said windshield wiping unit comprising:

a pivot holder attached to a body of the vehicle and having a cylindrical bearing part;

a pivot shaft extended through and supported for turning in the bearing part on the pivot holder;

a wiper arm having a base end part fixed to an outer end part of the pivot shaft;

a wiper blade assembly having a wiper blade and connected to a free end of the wiper arm;

a retaining member interposed between the bearing part and the pivot shaft to restrain the pivot shaft from axial movement relative to the bearing part, and the retaining member deforms to permit the pivot shaft to move axially into the bearing part when an axial force exceeding a predetermined level is exerted on the pivot shaft; and a washer disposed on said pivot shaft above said bearing part, said washer having an outside diameter which is smaller than an inside diameter of said bearing part so that the washer moves axially into the bearing part when the axial force exceeding the predetermined level is exerted on the pivot shaft.

11. The windshield wiper device according to claim 10, wherein the bearing part of the pivot holder is provided on its outer surface with a flange attached to the body of the vehicle, the flange has a thin annular part having a reduced fracture strength relative to the rest of the flange and is contiguous with the bearing part, and said flange fractures at said thin annular part to permit said pivot holder to move inwardly of the vehicle body when a sufficiently large force is exerted on the pivot shaft.

12. The windshield wiper device according to claim 10, further including an axial movement control means for permitting the pivot shaft to move axially by a predetermined distance when the retaining member is fractured and for reducing an acceleration of the pivot shaft.

13. The windshield wiper device according to claim 12, wherein the axial movement control means comprises a support member having a cylindrical shape, pressed in and held in place by a predetermined holding force in an axial bore of the pivot holder with its end surface spaced from said retaining member, and supporting the pivot shaft for turning.

14. The windshield wiping device according to claim 10, wherein the wiper arm is provided with a cylindrical skirt surrounding an outer end part of the pivot shaft, and the pivot holder is provided with a boss to be received in the skirt in a final stage of the axial movement of the pivot shaft into the bearing part of the pivot holder.

15. The windshield wiper device according to claim 10 further comprising a driving mechanism for rotatively driving the pivot shaft, comprising:

a turning lever having one end fixed to a base end part of the pivot shaft;

a driving means fixedly mounted on the body of the vehicle; and a bar link connecting another end of the turning lever to the driving means;

wherein the bar link is connected to the other end of the turning lever for turning relative to the turning lever by a ball-and-socket joint.

16. The windshield wiper device according to claim 10, wherein said retaining member deforms by fracturing into multiple pieces.

17. The windshield wiper device according to claim 10, wherein said retaining member has low ductility and low strength such that it is deformable when the axial force exceeding the predetermined level is exerted on the pivot shaft.

18. The windshield wiper device according to claim 10, wherein said pivot shaft has an annular groove defined therein above the retaining member, and the device further includes a stopper ring fitted in said groove.

19. The windshield wiper device according to claim 10, wherein said retaining member non-elastically deforms to permit the pivot shaft to move axially into the bearing part when the axial force exceeding a predetermined level is exerted on the pivot shaft.

20. A windshield wiper device for a vehicle, comprising at least one windshield wiping unit, said windshield wiping unit comprising:

a pivot holder attached to a body of the vehicle and having a cylindrical bearing part;

a pivot shaft extended through and supported for turning in the bearing part on the pivot holder;

a wiper arm having a base end part fixed to an outer end part of the pivot shaft;

a wiper blade assembly having a wiper blade and connected to a free end of the wiper arm;

a retaining member interposed between the bearing part and the pivot shaft to restrain the pivot shaft from axial movement relative to the bearing part, and the retaining member deforms to permit the pivot shaft to move axially into the bearing part when an axial force exceeding a predetermined level is exerted on the pivot shaft; and the wiper arm being provided with a cylindrical skirt surrounding an outer end part of the pivot shaft, said skirt being provided in its end edge with notches arranged at angular intervals.

* * * * *

UNITED STATES PATENT AND TRADEMARK OFFICE
CERTIFICATE OF CORRECTION

PATENT NO.      : 6,317,918 B1
DATED           : November 20, 2001
INVENTOR(S)     : M. Kagawa, K. Kuno, J. Kamiya and Y. Watanabe It is certified that error appears in the above-identified patent and that said Letters Patent is hereby corrected as shown below:

Title page,
Item [57], ABSTRACT",
Line 13, after "retaining" insert -- ring --.

Column 1,
Line 39, change "various exposure to" to -- exposure to various --.
Line 40, change "maybe" to -- may be --.

Column 2,
Line 37, change "with a thin annular part having" to -- having a thin annular part with --.

Column 4,
Line 4, after "Therefore" insert a comma.
Line 20, change "with out" to -- without --.
Line 40, after "connected" insert -- to --.
Line 50, change "thereon to" to -- thereon, --.

Column 5,
Line 9, change "FIG.1:" to -- FIG. 1; --.
Line 14, after "FIG. 5 is" insert -- a --.

Column 6,
Line 45, change "Is" to -- is --.

Column 7,
Line 44, after "10" insert -- and --.

Column 8,
Line 10, before "present" insert -- the --.
Line 16, change "and, and" to -- , and --.
Line 47, after "shaft" insert -- 50 --.
Line 50, change "holder 50" to -- holder 60 --.
Line 62, before "present" insert -- the --.

UNITED STATES PATENT AND TRADEMARK OFFICE
CERTIFICATE OF CORRECTION

PATENT NO. : 6,317,918 B1
DATED : November 20, 2001
INVENTOR(S) : M. Kagawa, K. Kuno, J. Kamiya and Y. Watanabe It is certified that error appears in the above-identified patent and that said Letters Patent is hereby corrected as shown below:

Column 9,
Line 25, after "Thus" insert a comma; change "absorber" to -- absorbed --.
Line 33, change "ring in" to -- ring 63 in --.

Column 12,
Line 43, after "however" insert a comma.

Column 13,
Line 46, change "sage" to -- stage --.

Column 14,
Line 21, change "d184" to -- 184 --.

Column 15,
Line 47, change "with out" to -- without --.

Signed and Sealed this

Twentieth Day of August, 2002

*Attest:*

JAMES E. ROGAN
*Attesting Officer*     *Director of the United States Patent and Trademark Office*